US011038649B2

(12) United States Patent
Guo et al.

(10) Patent No.: US 11,038,649 B2
(45) Date of Patent: Jun. 15, 2021

(54) METHOD AND APPARATUS FOR CSI REPORT IN NEXT GENERATION WIRELESS SYSTEM

(71) Applicant: Samsung Electronics Co., Ltd., Gyeonggi-do (KR)

(72) Inventors: Li Guo, Allen, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/874,692

(22) Filed: Jan. 18, 2018

(65) Prior Publication Data

US 2018/0219664 A1     Aug. 2, 2018

Related U.S. Application Data

(60) Provisional application No. 62/583,817, filed on Nov. 9, 2017, provisional application No. 62/558,586, filed
(Continued)

(51) Int. Cl.
*H04L 5/00* (2006.01)
*H04W 52/42* (2009.01)
(Continued)

(52) U.S. Cl.
CPC ......... *H04L 5/0053* (2013.01); *H04B 17/318* (2015.01); *H04L 5/005* (2013.01);
(Continued)

(58) Field of Classification Search
CPC ..... H04B 17/318; H04L 5/005; H04L 5/0053; H04L 5/0057; H04L 5/0094; H04W 24/10; H04W 52/42
(Continued)

(56) References Cited

U.S. PATENT DOCUMENTS 9,198,071 B2     11/2015   Geirhofer et al.
2011/0281587 A1*  11/2011   Jokinen ............ H04W 36/0094
                                                              455/437
(Continued)

FOREIGN PATENT DOCUMENTS

EP    2536218 A1 *  12/2012   ............ H04W 24/10
EP    2842361 A1      3/2015
(Continued)

OTHER PUBLICATIONS

"LTE; Evolved Universal Terrestrial Radio Access (E-UTRA); Physical Channels and Modulation (3GPP TS 36.211 Version 13.0.0 Release 13)," ETSI TS 136.211, V13.0.0, Jan. 2016, 143 pages.
(Continued)

*Primary Examiner* — Yemane Mesfin
*Assistant Examiner* — Intekhaab A Siddiquee

(57) ABSTRACT

A method for reporting channel information by a user equipment (UE) is provided. The method comprises receiving, by the UE, configuration information from a base station (BS), the configuration information indicating K channel state information (CSI) reference signal (RS) resources configured, by the BS, for measurement by the UE; measuring, by the UE, a layer one (L1) reference signal received power (RSRP) for one or more of the K CSI-RS resources; selecting, by the UE, N of the K CSI-RS resources for reporting in a reporting instance; generating, by the UE, a report for the N CSI-RS resources, the generated report including a CSI-RS resource index (CRI) for each of the N CSI-RS resources, a L1-RSRP value for one of the N CSI-RS resources having a largest L1-RSRP, and a differential L1-RSRP value for each of the other of the N CSI-RS resources; and transmitting, by the UE, the generated report to the BS in the reporting instance.

24 Claims, 13 Drawing Sheets

Related U.S. Application Data on Sep. 14, 2017, provisional application No. 62/532,931, filed on Jul. 14, 2017, provisional application No. 62/489,695, filed on Apr. 25, 2017, provisional application No. 62/476,277, filed on Mar. 24, 2017, provisional application No. 62/459,817, filed on Feb. 16, 2017, provisional application No. 62/453,284, filed on Feb. 1, 2017.

(51) Int. Cl.
*H04W 24/10* (2009.01)
*H04B 17/318* (2015.01)

(52) U.S. Cl.
CPC ........... *H04W 24/10* (2013.01); *H04W 52/42* (2013.01); *H04L 5/0057* (2013.01); *H04L 5/0094* (2013.01)

(58) Field of Classification Search
USPC ....................................................... 370/252
See application file for complete search history.

(56) References Cited

U.S. PATENT DOCUMENTS

| | | | |
|---|---|---|---|
| 2013/0183979 A1* | 7/2013 | Chen | H04W 36/30 455/436 |
| 2013/0322376 A1* | 12/2013 | Marinier | H04B 7/2612 370/329 |
| 2014/0362720 A1 | 12/2014 | Kim et al. | |

FOREIGN PATENT DOCUMENTS

| | | |
|---|---|---|
| EP | 2849481 A1 | 3/2015 |
| WO | 2012124552 A1 | 9/2012 |
| WO | 2013160795 A1 | 10/2013 |
| WO | 2014062029 A1 | 4/2014 |

OTHER PUBLICATIONS

"3rd Generation Partnership Project; Technical Specification Group Radio Access Network; Evolved Universal Terrestrial Radio Access (E-UTRA); Multiplexing and Channel Coding (Release 13)," 3GPP TS 36.212, V13.0.0, Dec. 2015, 121 pages.

"LTE; Evolved Universal Terrestrial Radio Access (E-UTRA); Physical Layer Procedures (3GPP TS 36.213 Version 13.0.0 Release 13)," ETSI TS 136.213, V13.0.0, May 2016, 328 pages.

"LTE; Evolved Universal Terrestrial Radio Access (E-UTRA); Medium Access Control (MAC) Protocol Specification (3GPP TS 36.321 Version 13.0.0 Release 13)," ETSI TS 136.321, V13.0.0, Feb. 2016, 84 pages.

"LTE; Evolved Universal Terrestrial Radio Access (E-UTRA); Radio Resource Control (RRC) Protocol Specification (3GPP TS 36.331 Version 13.0.0 Release 13)," ETSI TS 136.331, V13.0.0, Jan. 2016, 670 pages.

International Search Report and Written Opinion regarding Application No. PCT/KR2018/001395, dated May 17, 2018, 12 pages.

European Patent Office, Supplementary European Search Report for Application No. EP18747640.3, dated Oct. 16, 2019, 8 pages.

Moray, Rumney, "Physical Layer," Chapter 3 of LTE and the Evolution of 4G Wireless: Design and Measurement Challenges, Second Edition, Mar. 31, 2013, 67 pages.

\* cited by examiner

METHOD AND APPARATUS FOR CSI REPORT IN NEXT GENERATION WIRELESS SYSTEM

CROSS-REFERENCE TO RELATED APPLICATIONS AND CLAIM OF PRIORITY

The present application claims priority to U.S. Provisional Patent Application Ser. No. 62/453,284, filed on Feb. 1, 2017; U.S. Provisional Patent Application Ser. No. 62/459,817, filed on Feb. 16, 2017; U.S. Provisional Patent Application Ser. No. 62/476,277, filed on Mar. 24, 2017; U.S. Provisional Patent Application Ser. No. 62/489,695, filed on Apr. 25, 2017; U.S. Provisional Patent Application Ser. No. 62/532,931, filed on Jul. 14, 2017; U.S. Provisional Patent Application Ser. No. 62/558,586, filed on Sep. 14, 2017; and U.S. Provisional Patent Application Ser. No. 62/583,817, filed on Nov. 9, 2017. The contents of the above-identified patent documents are incorporated herein by reference.

TECHNICAL FIELD

The present application relates generally to feedback report operation in wireless communication systems. More specifically, this disclosure relates to CSI report operation in next generation wireless communication systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide multiple services in advanced communication systems.

In one embodiment, s user equipment (UE) for reporting channel information is provided. The UE comprises a transceiver configured to receive configuration information from a base station (BS), the configuration information indicating K channel state information (CSI) reference signal (RS) resources configured, by the BS, for measurement by the UE. The UE further comprises a processor operably connected to the transceiver, the processor configured to measure a layer one (L1) reference signal received power (RSRP) for one or more of the K CSI-RS resources; select N of the K CSI-RS resources for reporting in a reporting instance; and generate, by the UE, a report for the N CSI-RS resources, the generated report including a CSI-RS resource index (CRI) for each of the N CSI-RS resources, a L1-RSRP value for one of the N CSI-RS resources having a largest L1-RSRP, and a differential L1-RSRP value for each of the other of the N CSI-RS resources, wherein the transceiver is further configured to transmit the generated report to the BS in the reporting instance.

In another embodiment, a BS for configuring channel information reporting is provided. The BS comprises a processor configured to generate configuration information indicating K CSI-RS resources configured for measurement by a UE. The BS further comprises a transceiver operably connected to the processor the transceiver configured to transmit the configuration information to the UE; and receive a report for N of the K CSI-RS resources in a reporting instance, the report including a CRI for each of the N CSI-RS resources, a L1-RSRP value for one of the N CSI-RS resources having a largest L1-RSRP, and a differential L1-RSRP value for each of the other of the N CSI-RS resources.

In yet another embodiment, a method for reporting channel information by a UE is provided. The method comprises receiving, by the UE, configuration information from a base station (BS), the configuration information indicating K CSI-RS resources configured, by the BS, for measurement by the UE; measuring, by the UE, a L1-RSRP for one or more of the K CSI-RS resources; selecting, by the UE, N of the K CSI-RS resources for reporting in a reporting instance; generating, by the UE, a report for the N CSI-RS resources, the generated report including a CRI for each of the N CSI-RS resources, a L1-RSRP value for one of the N CSI-RS resources having a largest L1-RSRP, and a differential L1-RSRP value for each of the other of the N CSI-RS resources; and transmitting, by the UE, the generated report to the BS in the reporting instance.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v13.0.0, "E-UTRA, Physical channels and modulation;" 3GPP TS 36.212 v13.0.0, "E-UTRA, Multiplexing and Channel coding;" 3GPP TS 36.213 v13.0.0, "E-UTRA, Physical Layer Procedures;" 3GPP TS 36.321 v13.0.0, "E-UTRA, Medium Access Control (MAC) protocol specification;" and 3GPP TS 36.331 v13.0.0, "E-UTRA, Radio Resource Control (RRC) Protocol Specification."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
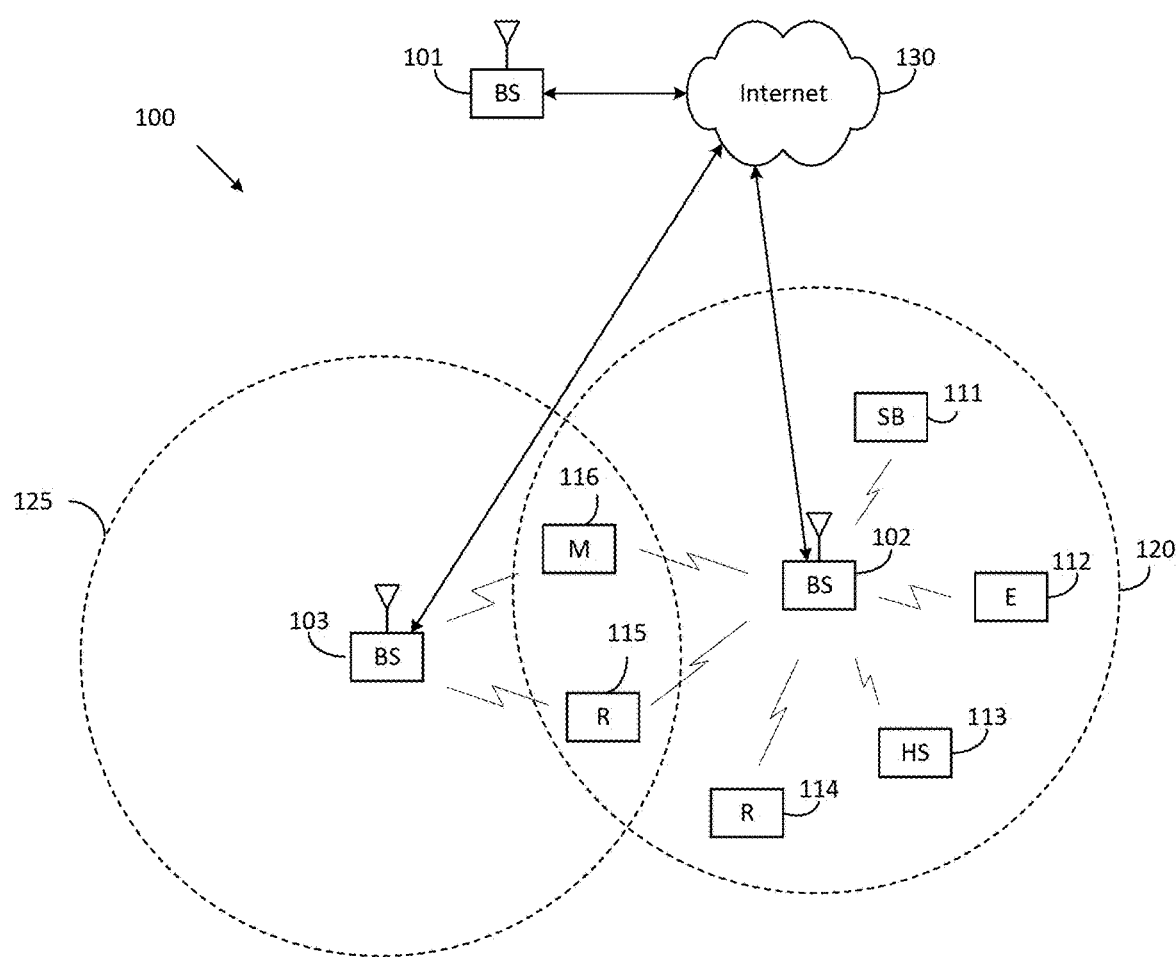
FIG. 1 illustrates an example wireless network according to embodiments of the present disclosure.
Figure 2:
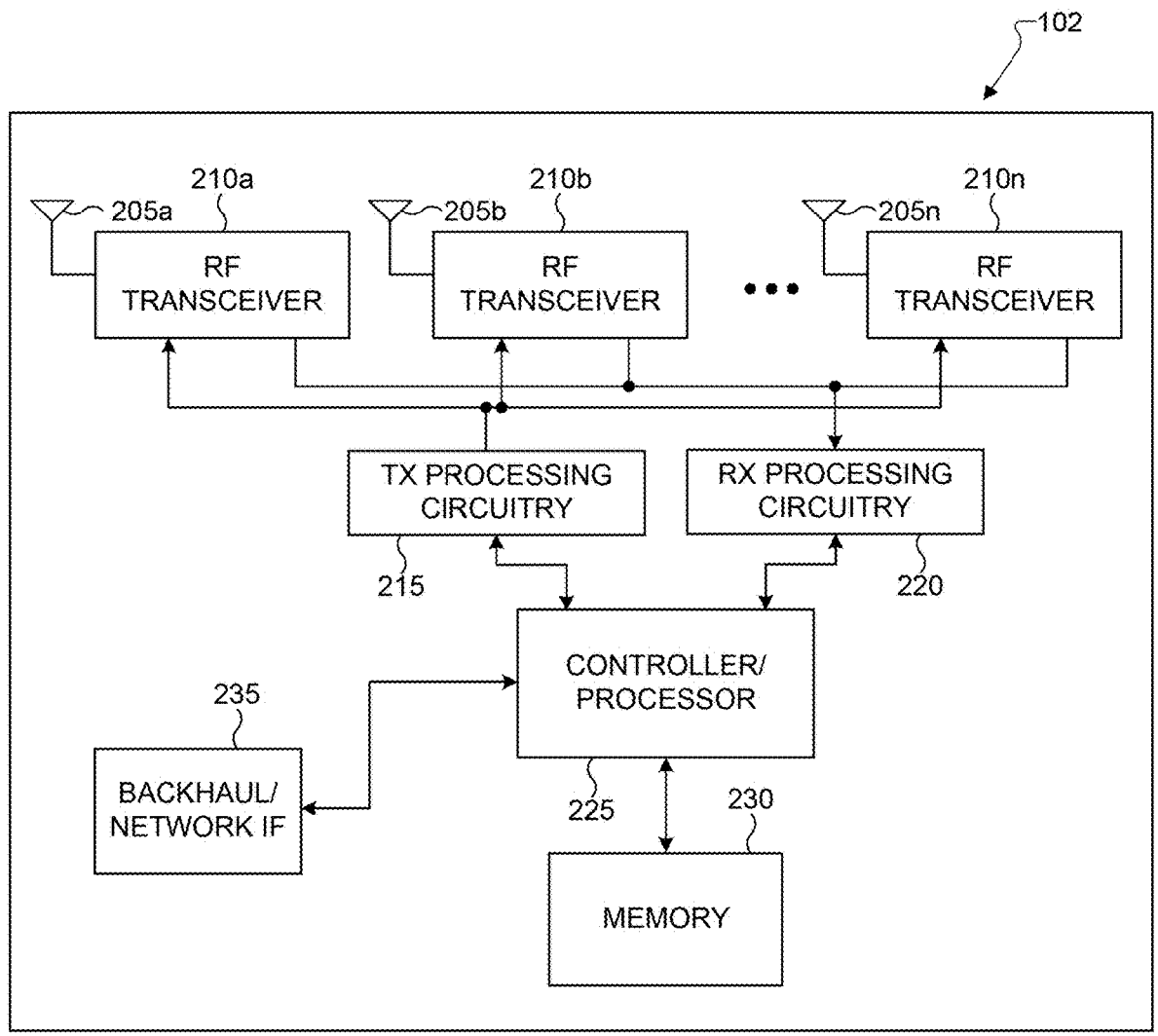
FIG. 2 illustrates an example eNB according to embodiments of the present disclosure.
Figure 3:
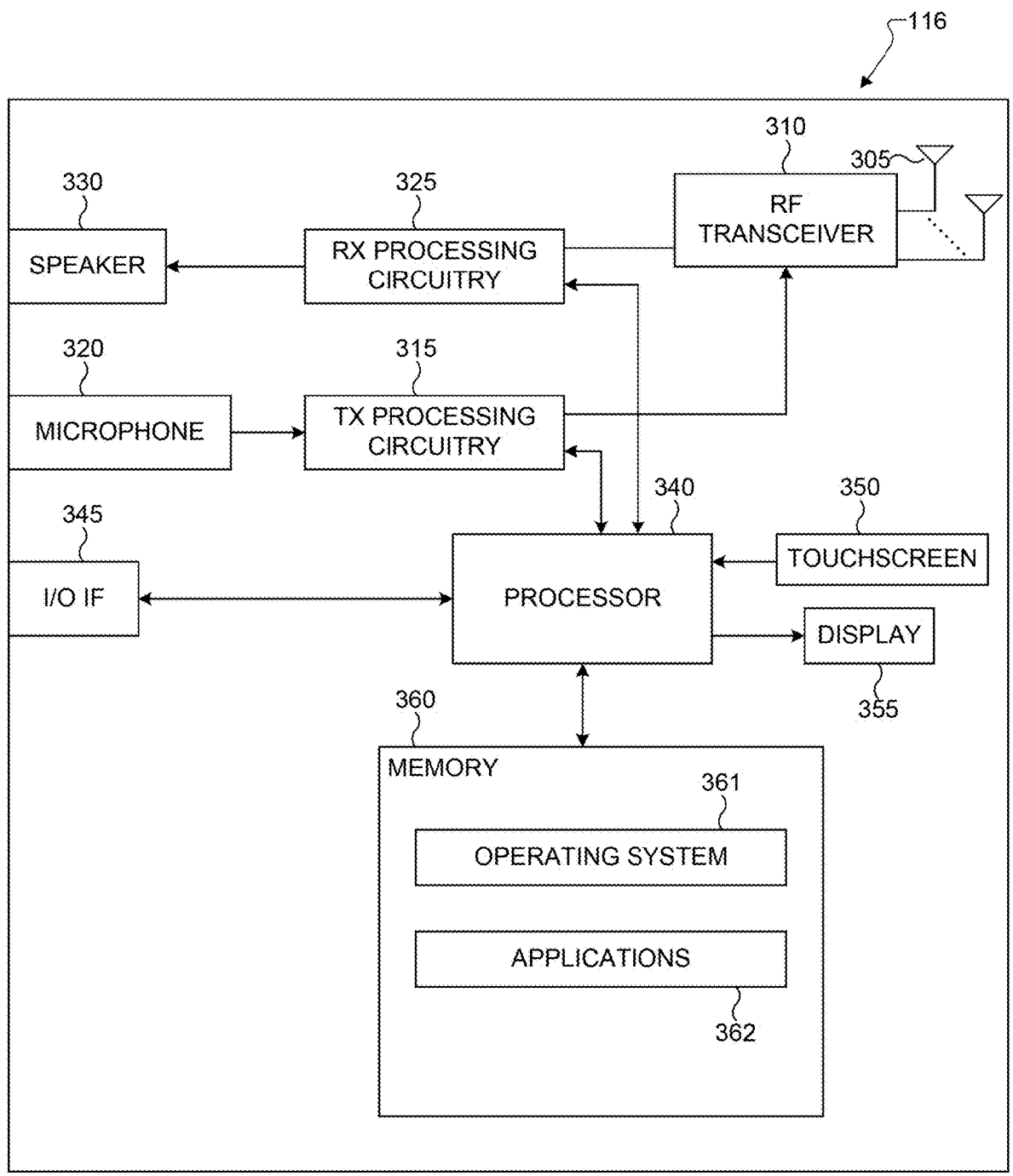
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient CSI report in an advanced wireless communication system. In certain embodiments, and one or more of the eNBs 101-103 includes circuitry, programming, or a combination thereof, for efficient CSI report an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
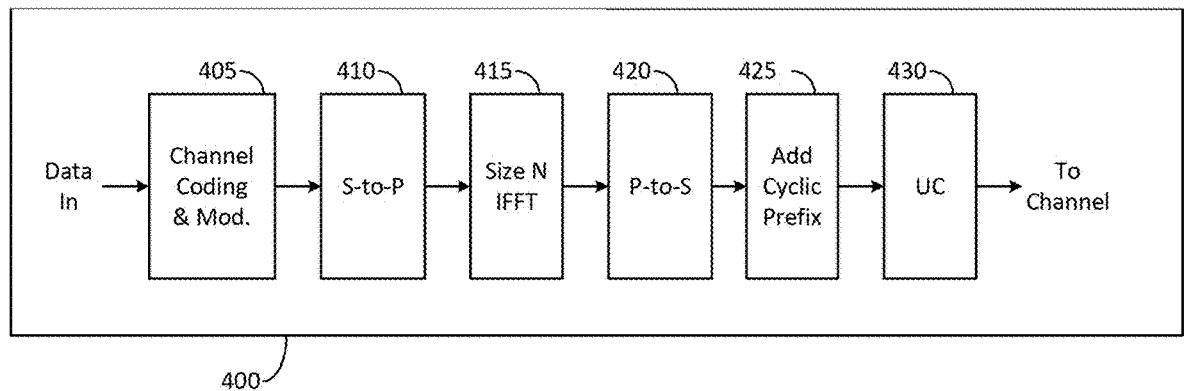
FIG. 4A illustrates an example high-level diagram of an orthogonal frequency division multiple access transmit path according to embodiments of the present disclosure.
Figure 4B:
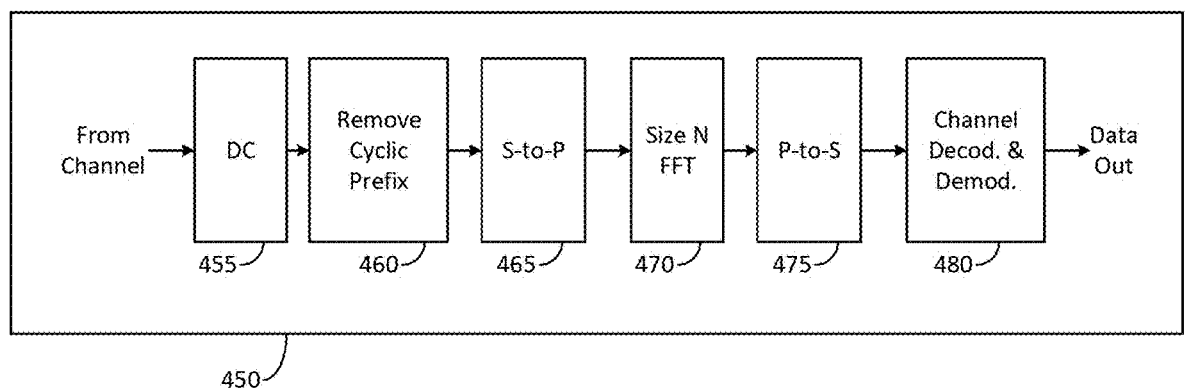
FIG. 4B illustrates an example high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

Figure 5:
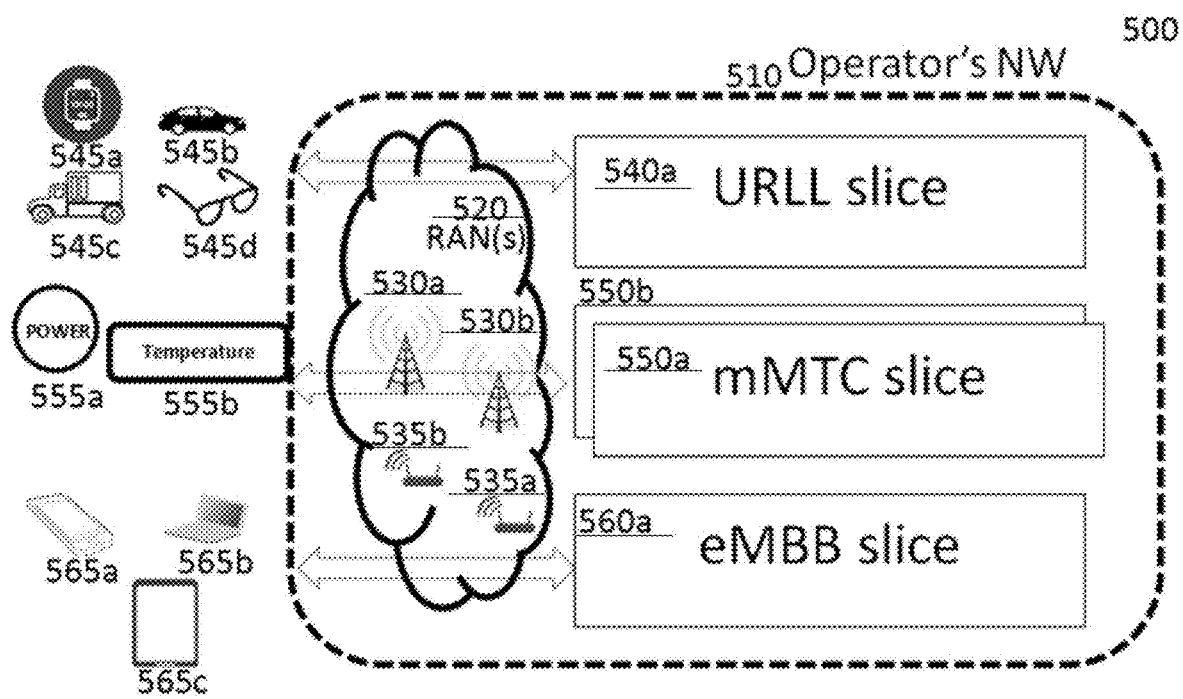
FIG. 5 illustrates an example network slicing according to embodiments of the present disclosure.

FIG. 5 illustrates a network slicing 500 according to embodiments of the present disclosure. An embodiment of the network slicing 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

As shown in FIG. 5, the network slicing 500 comprises an operator's network 510, a plurality of RANS 520, a plurality of eNBs 530a, 530b, a plurality of small cell base stations 535a, 535b, a URLL slice 540a, a smart watch 545a, a car 545b, a, truck 545c, a smart glasses 545d, a power 555a, a temperature 555b, an mMTC slice 550a, an eMBB slice 560a, a smart phone (e.g., cell phones) 565a, a laptop 565b, and a tablet 565c (e.g., tablet PCs).

The operator's network 510 includes a number of radio access network(s) 520 RAN(s)—that are associated with network devices, e.g., eNBs 530a and 530b, small cell base stations (femto/pico eNBs or Wi-Fi access points) 535a and 535b, etc. The operator's network 510 can support various services relying on the slice concept. In one example, four slices, 540a, 550a, 550b and 560a, are supported by the network. The URLL slice 540a to serve UEs requiring URLL services, e.g., cars 545b, trucks 545c, smart watches 545a, smart glasses 545d, etc. Two mMTC slices 550a and 550b serve UEs requiring mMTC services such as power meters and temperature control (e.g., 555b), and one eMBB slice 560a requiring eMBB serves such as cells phones 565a, laptops 565b, tablets 565c.

In short, network slicing is a scheme to cope with various different qualities of services (QoS) in the network level. For supporting these various QoS efficiently, slice-specific PHY optimization may also be necessary. Devices 545a/b/c/d, 555a/b are 565a/b/c examples of user equipment (UE) of different types. The different types of user equipment (UE) shown in FIG. 5 are not necessarily associated with particular types of slices. For example, the cell phone 565a, the laptop 565b and the tablet 565c are associated with the eMBB slice 560a, but this is just for illustration and these devices can be associated with any types of slices.

In some embodiments, one device is configured with more than one slice. In one embodiment, the UE, (e.g., 565a/b/c) is associated with two slices, the URLL slice 540a and the eMBB slice 560a. This can be useful for supporting online gaming application, in which graphical information are transmitted through the eMBB slice 560a, and user interaction related information are exchanged through the URLL slice 540a.

In the current LTE standard, no slice-level PHY is available, and most of the PHY functions are utilized slice-agnostic. A UE is typically configured with a single set of PHY parameters (including transmit time interval (TTI) length, OFDM symbol length, subcarrier spacing, etc.), which is likely to prevent the network from (1) fast adapting to dynamically changing QoS; and (2) supporting various QoS simultaneously.

In some embodiments, corresponding PHY designs to cope with different QoS with network slicing concept are disclosed. It is noted that "slice" is a terminology introduced just for convenience to refer to a logical entity that is associated with common features, for example, numerology, an upper-layer (including medium access control/radio resource control (MAC/RRC)), and shared UL/DL time-frequency resources. Alternative names for "slice" include virtual cells, hyper cells, cells, etc.

Figure 6:
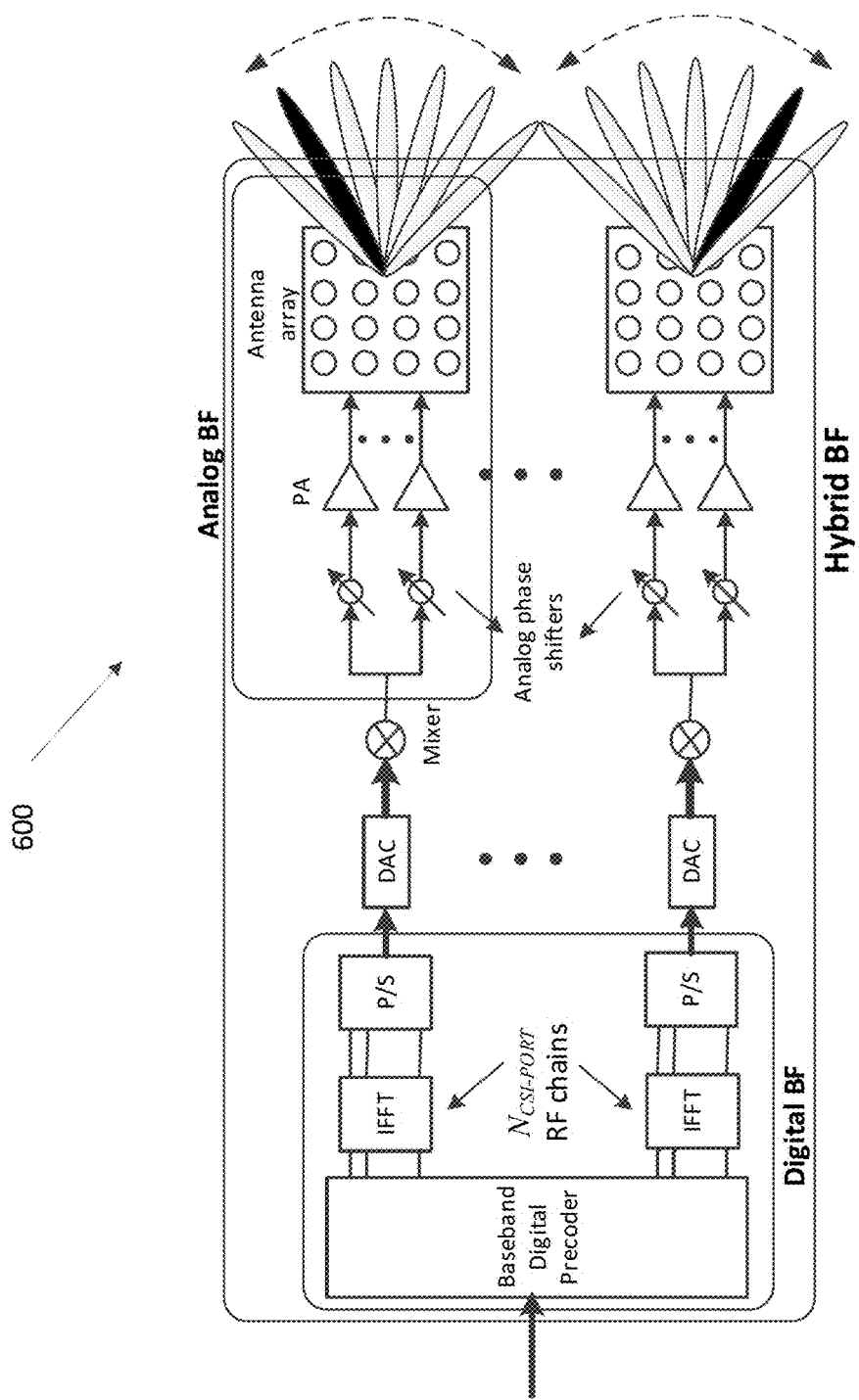
FIG. 6 illustrates an example number of digital chains according to embodiments of the present disclosure.

FIG. 6 illustrates an example number of digital chains 600 according to embodiments of the present disclosure. An embodiment of the number of digital chains 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

LTE specification supports up to 32 channel state information-reference signal (CSI-RS) antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

For mmWave bands, although the number of antenna elements can be larger for a given form factor, the number of CSI-RS ports which can correspond to the number of digitally precoded ports tends to be limited due to hardware constraints (such as the feasibility to install a large number of ADCs/DACs at mmWave frequencies) as illustrated in FIG. 6. In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI-PORT}$. A digital beamforming unit 610 performs a linear combination across $N_{CSR-PORT}$ analog beams to further increase precoding gain. While analog beams are wideband (hence not frequency-selective), digital precoding can be varied across frequency sub-bands or resource blocks.

A gNB could utilize one or multiple transmit beams to cover the whole area of one cell. The gNB may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may be feasible for gNB to provide coverage with a single transmit beam, i.e., ensure adequate received signal quality at the UE locations within the coverage area via the usage of a single transmit beam. In other words, at lower transmit signal carrier frequencies, the transmit power amplification provided by the transmit beam with a width large enough to cover the area may be sufficient to overcome the propagation losses to ensure adequate received signal quality at UE locations within the coverage area.

However, at higher signal carrier frequencies, the transmit beam power amplification corresponding to the same coverage area may not be sufficient to overcome the higher propagation losses, resulting in a degradation of received signal quality at UE locations within the coverage area. In order to overcome such a received signal quality degradation, the gNB may form a number of transmit beams, each providing coverage over a region narrower than the overall coverage region, but providing the transmit power amplification sufficient to overcome the higher signal propagation loss due to the usage of higher transmit signal carrier frequencies.

Figure 7:
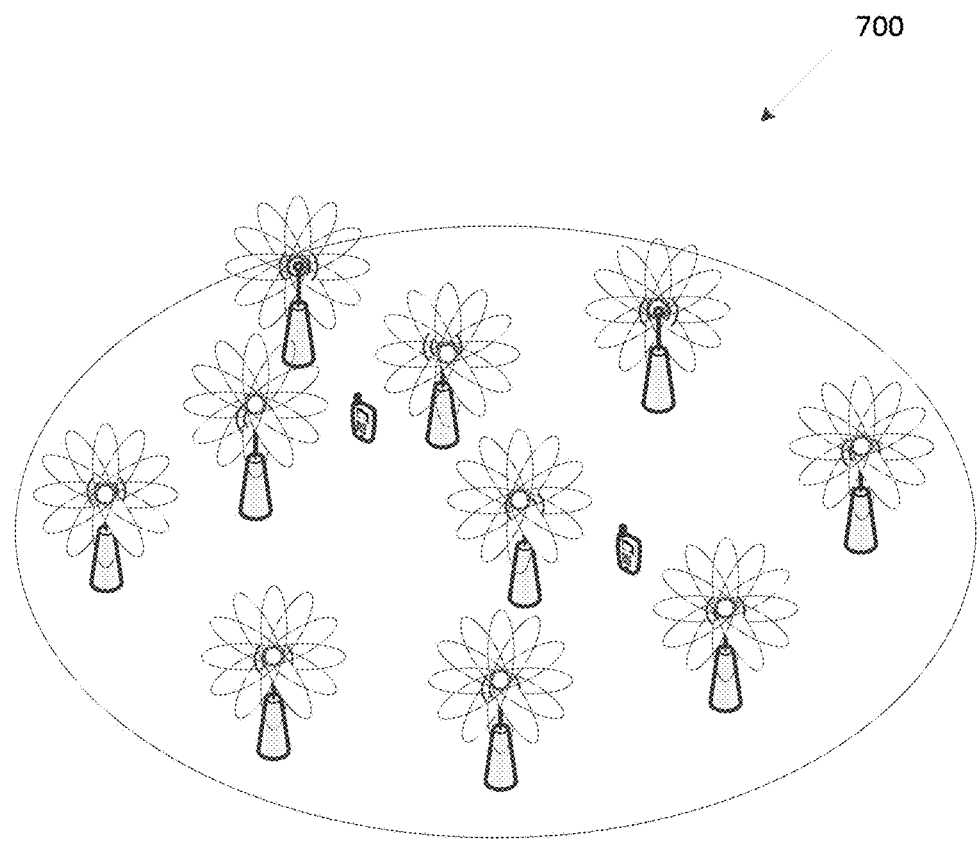
FIG. 7 illustrates an example multiple beam configuration according to embodiments of the present disclosure.

FIG. 7 illustrates an example multiple beam configuration 700 according to embodiments of the present disclosure. An embodiment of the multiple beam configuration 700 shown in FIG. 7 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

The 5G system is generally a multi-beam based system. In such a system, multiple beams are used to cover one coverage area. An example for illustration is shown in FIG. 7. As shown in FIG. 7, one gNB has one or more TRPs. Each TRP uses one or more analog beams to cover some area. To cover one UE in one particular area, the gNB use one or more analog beams to transmit and receive the signal to and from that UE. The gNB and the UE need to determine the beam(s) used for their connection. When the UE moves within one cell coverage area, the beam(s) used for this UE may be changed and switched. It was agreed in 3GPP NR RAN1 meetings that the operation of managing those beams are L1 and L2 operation.

In the present disclosure, a "beam" can correspond to an RS resource, whether the beam is a sounding reference signal (SRS), CSI-RS, beam RS, measurement RS, or any other type of RS.

In high frequency band system (e.g., >6 GHz system), the TRP and the UE can be deployed with large number of antennas to relay on the high gain beamforming to defeat the large path loss and signal blockage. A general system configuration is that the TRP and UE have large number antenna but only one or a few TXRUs. So hybrid beamforming mechanism is utilized. Analog beams with different direction can be formulated on the antenna array that is connected to one TXRU. To get the best link quality and coverage distance, the TRP and UE need to align the analog beam directions for each particular downlink and uplink transmission.

An uplink transmission is more power limited than a downlink transmission due to the limited Tx power and battery capacity of the UE. To defeat the path loss in uplink and provide good link quality, the gNB and the UE need to select the "best" UE Tx analog beams that are supposed to point to serving gNB and the "best" TRP Rx beams that are supposed to point to the direction of that UE. To achieve this, the UE can send some uplink RS that conveys the UE Tx beams and the gNB can measure the quality of Tx beams by measuring the signal power or signal quality in the corresponding uplink RS.

The UE may be able to be configured to apply the Tx beams on the uplink RS by various manners to meet the different diverse uplink beam management requirements. For example, the gNB may need to refine TRP Rx beam with respect to one UE Tx beam, and the UE may apply the same Tx beam on multiple uplink RS resources so that the gNB can apply different Rx beams. For example, the gNB and UE may need to refine Tx beam among a few analog Tx beam candidates, and the UE may apply those Tx beam candidates on different uplink RS resources and the gNB can measure the quality of those Tx beam candidates by measures the signal in corresponding RS resource. To support that, the design of uplink RS (for example NR-SRS) may support conveying the information of analog Tx beams and NR-SRS procedure may support the various methods of analog Tx beam transmission and sweeping.

In some embodiments, the UE is configured to measure some downlink CSI-RS transmissions and then report the measurement results. The CSI-RS can also be called MRS, BRS, DRS or BMRS. In the following discussion, CSI-RS is going to be used as exemplary for simplified discussion and can be substituted with other names and labels without changing the substance of these embodiments.

The UE can be configured with CSI-RS transmission with K≥1 CSI-RS resources. The configuration can include the following components. In one example for the configuration setting of K≥1 CSI-RS resources, each CSI-RS resource can contain one or more OFDM symbols and one or more antenna ports in frequency domain. In another example, the CSI-RS transmission can be periodic, semi-persistent, and aperiodic. If the CSI-RS transmission is periodic or a semi-persistent transmission, the slot offset and periodicity can be configured. In yet another example for the setting of CSI-RS resource grouping, the K≥1 CSI-RS resources can be partitioned into one or more CSI-RS subsets. Each CSI-RS resource subset can comprises one or more CSI-RS resources. Two CSI-RS subsets can have overlapped CSI-RS resources or not. In yet another example for the setting of TRP Tx beam sweeping manner over configured CSI-RS resources, the setting of TRP Tx beam sweeping manner would be useful for the UE in measuring.

In one embodiment, the Tx beams are swept across CSI-RS resources. Each CSI-RS resource can correspond to one Tx beam. The UE can be requested to measure the following: the quality of one Tx beam by measuring the RSRP/RSRQ/CQI of the corresponding CRI-RS resource; and the CSI for one Tx beam, the UE can measure the PMI/RI/CQI of the corresponding CSI-RS resource.

In some embodiments, the UE can be configured with K CSI-RS resources and the Tx beam sweeping manner across those K CSI-RS resources. The Tx beam sweeping manner can be configured to the UE. In one example, different Tx beams are applied to different CSI-RS resources, it is useful to the gNB to transmit different Tx beams and the UE can select one from multiple TRP Tx beams. In another example, same Tx beam is applied to different CSI-RS resources. Such example is useful for the gNB to request the UE to measure multiple Rx beam modes with respect to one TRP Tx beam. In yet another example, the CSI-RS resources are partitioned into multiple subsets, different Tx beams are used for different subsets and the same Tx beam is applied to the CSI-RS resources in the same subset. Such example is useful for the gNB to request the UE to measure multiple Rx beam modes with respect to each of multiple TRP Tx beams.

In one embodiment for aperiodic CSI-RS transmission, the UE is configured with K CSI-RS resources through the RRC signaling. Then the UE is requested to transmit a set of M≤K CSI-RS resources through the triggering indication in MAC-CE or L1 signaling. In the triggering message, the CSI-SRS beam sweeping manner can also be signaled and the configuration information can include indication of beam sweeping manner over those M CSI-RS resources: different Tx beams applied to M CSI-RS resources or same Tx beam applied to M CSI-RS resources. In one example, the configuration information can include the grouping information of those M CSI-RS resources, for example, number of CSI-RS resource groups, the indices of CSI-RS resources in each CSI-RS resource group.

In one example, different Tx beams can be applied to CSI-RS resource in different CSI-RS resource group but same Tx beam is applied to the CSI-RS resource in the same CSI-RS resource group. In another example, the CSI-RS grouping configuration information is sent along with the K CSI-RS resource configuration through the RRC signaling. Then the UE is requested to transmit a set of M≤K CSI-RS resources through the triggering indication in MAC-CE or L1 signaling. An indication of CSI-RS grouping can be signaled through MAC-CE or L1 signaling for those configured M CSI-RS resources. That indication would indicate the UE whether the CSI-RS grouping may be applied or not. For example, if the UE is indicated of that the CSI-RS grouping is on, then the CSI-RS resources in one trigger transmission are partitioned with configured grouping information and the Tx beam sweeping manner configured is applied.

In one example, a default Tx beam sweeping manner is configured through the RRC signaling. The trigger message for aperiodic CSI-RS transmission can indicate the UE to use the configured default Tx beam sweeping manner or a dynamically configured manner for one semi-persistent transmission. The trigger message can configure a new Tx beam sweeping manner to the UE, which is applied to the triggered aperiodic CSI-RS transmission.

In one embodiment for semi-persistent CSI-RS transmission, the UE can be configured with K CSI-RS resources and the UE can be configured with the Tx beam sweeping manner. In one example, the CSI-RS resource Tx beam sweeping information can be signaled in RRC message. In another example, the CSI-SRS resource Tx beam sweeping manner information can be dynamically configured through MAC-CE and/or L1 signaling. The dynamic CSI-RS resource Tx beam sweeping information can be signaled as part of the activation message. In yet another example, a default Tx beam sweeping manner is configured through the RRC signaling for the semi-persistent CSI-RS transmission. The activation message can indicate the UE to use the configured default Tx beam sweeping manner or a dynamically configured manner for one semi-persistent transmission. The activation message can configure a new Tx beam sweeping manner to the UE, which is applied to the triggered semi-persistent transmission.

In one embodiment for periodic CSI-RS transmission, the UE can be configured with K CSI-RS resources and also the CSI-RS grouping configuration. The UE is requested to transmit the K NR-SRS resources with configured grouping information until new grouping information is configured.

In some embodiments, the UE can be configured to report the CRI (CSI-RS resource indication) in a multi-level manner. The UE can be configured with CSI-RS transmission with K CSI-RS resources. The CSI-RS transmission can be periodic, semi-persistent, and aperiodic. The K CSI-RS resources can be configured in system information (MIB, SIBs), RRC signaling, MAC-CE or L1 signaling.

Figure 8:
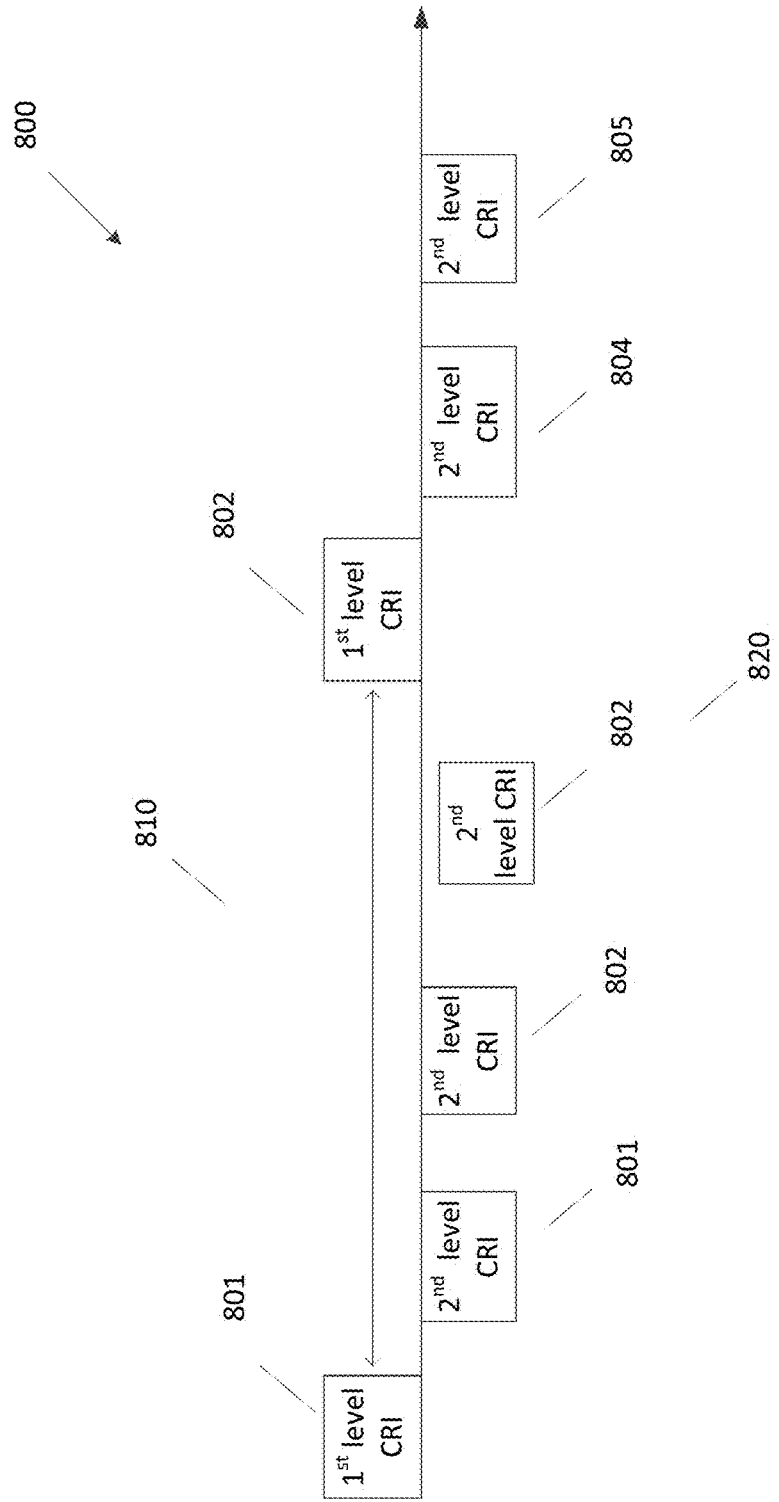
FIG. 8 illustrates an example multi-level CRI report according to embodiments of the present disclosure.

FIG. 8 illustrates an example multi-level CRI report 800 according to embodiments of the present disclosure. An embodiment of the multi-level CRI report 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

An example of multi-level CRI report is shown in FIG. 8. As illustrated in FIG. 8, the CRI report has two levels. The $1^{st}$ level CRI report 810 has a lower duty cycle and the $2^{nd}$ level CRI report 820 has a higher duty cycle. In the $1^{st}$ level CRI report, the UE can report the index of one CSI-RS resource group and in the $2^{nd}$ level CRI report, the UE can report one or more CSI-RS indices among the CSI-RS resource group reported in the $1^{st}$ level CRI report.

As illustrated in FIG. 8, the UE can report on CRI-RS resource group index in a first $1^{st}$ level CRI 2101 and then report one or more CSI-RS resource indices among the CSI-RS resource group reported in 801 in $2^{nd}$ level CRI reports 801, 802 and 803. In a second $1^{st}$ level CRI report 802, the UE can report on CSI-RS resource group. Then the UE can report one or more CSI-RS resource indices among the CSI-RS resource group reported in 802 in $2^{nd}$ level CRI reports 804 and 805.

In some embodiments, the UE can be configured to report the multi-level CRI report in a mixed signaling manner. In one embodiment, the UE can report the $1^{st}$ level CRI report in RRC signaling and the UE can report the $2^{nd}$ level CRI report in MAC-CE and/or L1 signaling (e.g., UCI).

The UE can be configured with K CSI-RS resources and the grouping partition information of those K CSI-RS resources. The configuration information can include the following: K CSI-RS resources; the number of CSI-RS resource groups, L; the indices of CSI-RS resources in each CSI-RS resource group; and the priority of each CSI-RS resource group.

The UE can be configured with the multi-level CRI reporting method. The configuration can include: the number of CRI report levels; the reporting contents of each CRI report level; and the reporting duty cycle of each CRI report level.

In one embodiment, the UE can be requested to report CRI with a 2-level CRI reporting manner. The configuration information can include the duty cycle of $1^{st}$ level CRI report and the reporting content in $1^{st}$ level CRI report, for example, the index of one selected CSI-RS resource group; for example, the index of one selected CSI-RS resource group and one RSRP/CQI/RSRQ value that can be average values of all CSI-RS resources in this group or the highest RSRP/CQI/RSRQ in the reported CSI-RS resource group. The configuration information can further include the duty cycle of $2^{nd}$ level CRI report and the reporting content in $2^{nd}$ level CRI report, for example one or more selected CSI-RS resource indices from the CSI-RS resource group reported in $1^{st}$ level CRI report. The reporting content can include one or more CSI-RS resource indices and the corresponding CQI/RSRP/RSRQ.

In one embodiment, the UE can be requested to report N selected CSI-RS resource indices and a signal strength ordering of those N reported CSI-RS resources. In one example, the UE can report a list of CSI-RS resource indices in CRI report: $\{C_{i1}, C_{i2}, \ldots, C_{iN}\}$, where $C_{i1}, C_{i2}, \ldots, C_{iN}$ are N selected CSI-RS resource indices and the ordering of them indicates the relative signal strength of them. In one example, the CSI-RS resource indices are sorted in an ascending order of the CQI/RSRP/RSRQ strength. In another example, the CSI-RS resource indices are sorted in a descending order of the CQI/RSRP/RSRQ strength.

In one embodiment of multi-level CRI reporting, the UE can be requested to report two selected CSI-RS resource groups in the $1^{st}$ level CRI report and the UE can be requested to report one or more selected CSI-RS resource indices from each reported CSI-RS resource group in $2^{nd}$ level CRI report.

In some embodiments, the UE can be configured to report a periodic/semi-persistent CSI report of some measurement results on some downlink reference signals and/or some downlink channel.

In multi-beam based system, each UE may be associated with one or more coverage beams. When the UE moves or environments vary, the association between one UE and beams might need to change to ensure the UE is covered with a good beam. The method in this embodiment would enable UE to monitor and report the status of current serving beams and then the gNB can rely on the reported information about current serving beams to determine and predict the quality of current serving beams. The gNB can also use such report to determine further action, for example the gNB can configure the UE to report more detailed beam state information through some aperiodic CSI report.

In some embodiments, the UE can be configured with the following configuration information. In one example, the configuration information may include the downlink reference signal (e.g., cell-specific CSI-RS) and/or the downlink channel (e.g., control channel, NR-PDCCH or data channel NR-PDSCH) which the UE is requested to measure and report the requested measurement results. In such example, in the downlink reference RS conveying multiple TRP Tx beams, the gNB can configure the UE with one or more Tx beam IDs which the UE is requested to measure. In such example with CSI-RS transmission with K CSI-RS resources, the gNB can configure the UE with one CSI-RS resource ID and the UE is requested to measure the configured CSI-RS resource. In another example, the configuration information may include the measurement and report contents: for example the CQI, RSRP or RSRQ of requested RS and/or channel. In yet another example, the configuration information may include the uplink channel or resource allocation where the UE is requested to send the configured report. In yet another example, the configuration information may include the periodicity of the report, for example, per NT slots. In yet another example, the configuration information may include the timing location of the report, for example, the slot offset and CP-OFDM/DFT-S-OFDM symbol index location in one slot.

Figure 9:
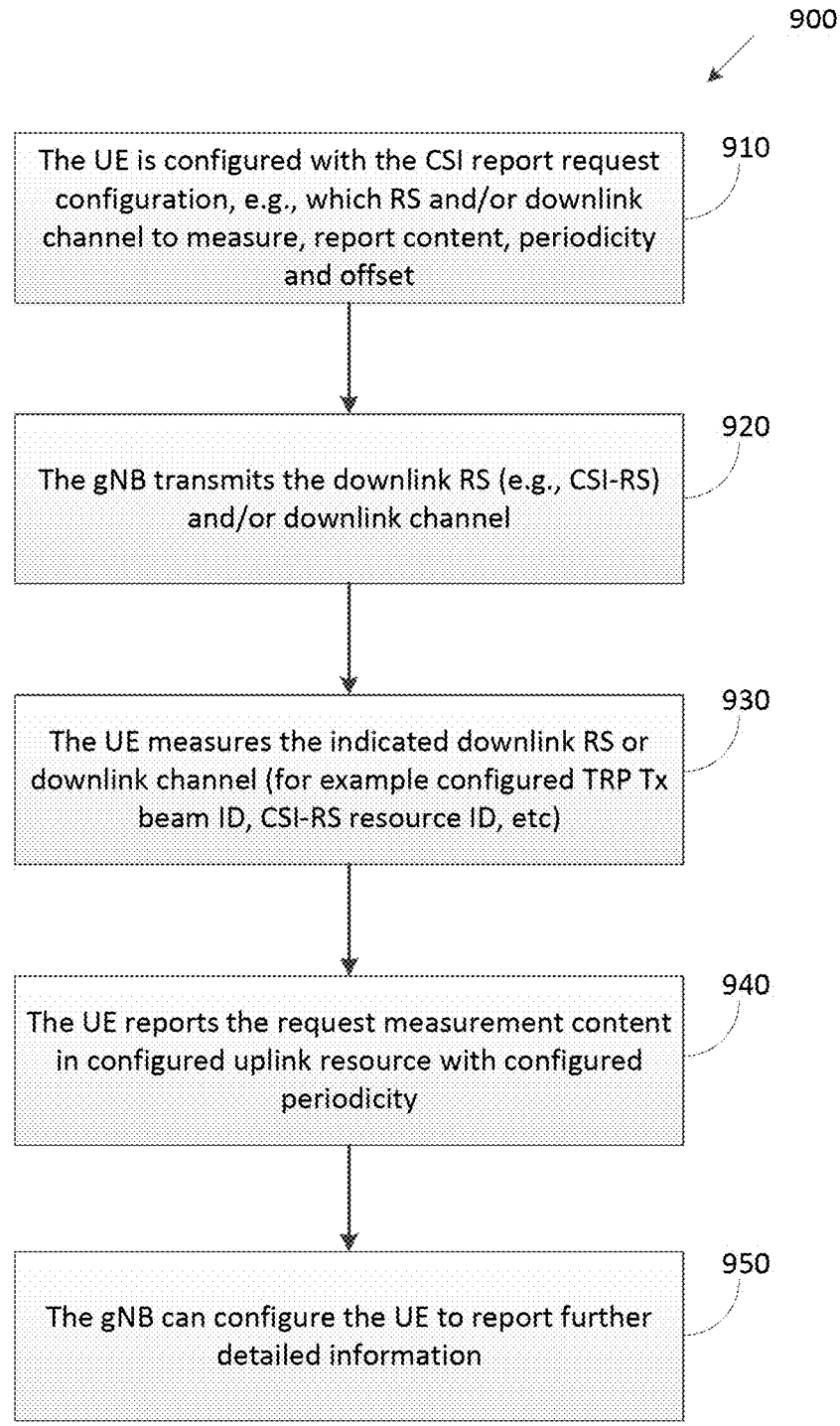
FIG. 9 illustrates a flowchart of a method for CSI report according to embodiments of the present disclosure.

FIG. 9 illustrates a flowchart of a method 900 for CSI report according to embodiments of the present disclosure. An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

An example procedure is shown in FIG. 9. As illustrated in FIG. 9, the UE is first configured with CSI report configuration in step 910. The report configuration includes the downlink RS and/or downlink channel the UE is configured to measure, the measurement and report contents, the uplink channel to send the report and periodicity/slot offset information of the report. Then in step 920, the gNB transmits the downlink reference signal (for example the periodic CSI-RS) and/or the downlink channel (for example NR-PDCCH, NR-PDSCH). In step 930, the UE measures the configured downlink reference signal or channel as requested. Then the UE reports the measurement content in step 940. Based on the report from the UE, the UE can be requested to report further detailed information in step 950.

In some embodiments, the UE can be configured to measure and monitor one or more TRP Tx beams conveyed in downlink reference signal. In one example, the UE can be requested to measure and monitor one or more CSI-RS resources among K CSI-RS resources. The UE can be configured with one TRP Tx beam ID from which the UE can calculate the resource index (OFDM symbol index and RS antenna port index) based on: the index of one RS resource; the index of one CSI-RS resources; a set of multiple TRP Tx beam IDs; a set of indices of downlink RS resources; and/or a set of M≤K CSI-RS resources among K CSI-RS resources in the transmission.

The UE can be configured to report one or more of the following. In one example, the UE reports CQI of the one or more configured TRP Tx beam or CSI-RS resource. In another example, the UE reports low resolution CQI of one or more configured TRP Tx beam or CSI-RS resource. In yet another example, the UE reports relative strength indication of the M TRP Tx beams or CSI-RS resources. In yet another example, the UE reports RSRP or RSRP of one or more indicated TRP Tx beams or CSI-RS resources. In such example, the UE can be requested to report N RSRP/RSRQ/CQI corresponding to the N reported or indicated beams. In such example, the UE can be requested to report one largest RSRP/RSRQ/CQI and N−1 of the difference between a largest RSRP/RSRQ/CQI and the RSRP/RSRQ/CQI of other reported/indicated N−1 beams. In such example, the UE can be requested to report one smallest RSRP/RSRQ/CQI and N−1 of the difference between a smallest RSRP/RSRQ/CQI and the RSRP/RSRQ/CQI of other reported/indicated N−1 beams.

In yet another example, the UE reports low resolution RSRP or RSRQ of one or more indicated TRP Tx beams or CSI-RS resources. In yet another example, the UE reports the variation of CQI, RSRP or RSRQ of one or more indicated TRP Tx beam or CSI-RS resources. In such example, the CQI/RSRP/RSRQ dB offset of one or more indicated TRP Tx beam or CSI-RS resources from last reporting. In yet another example, the UE reports the beam strength ordering of indicated TRP Tx beam or CSI-RS resources. In yet another example, the UE reports reporting the strongest RSRP/RSRQ/CQI, accompanied with ordering of the N reported beams. In such example, the RSRP/RSRQ/CQI can be normal resolution or low resolution.

In yet another example, the UE reports the strongest RSRP/RSRQ/CQI and the weakest RSRP/RSRQ/CQI, accompanied with ordering of the N reported beams. In such example: the RSRP/RSRQ/CQI can be normal resolution or low resolution; the UE can be requested to report one largest RSRP/RSRQ/CQI and one smallest RSRP/RSRQ/CQI; the UE can be request to report the largest RSRP/RSRQ/CQI value and the difference between largest RSRP/RSRQ/CQI−the smallest RSRP/RSRQ/CQI (i.e., Δ=largest RSRP/RSRQ/CQI−smallest RSRP/RSRQ/CQI); and/or the UE can be request to report the smallest RSRP/RSRQ/CQI value and the difference between largest RSRP/RSRQ/CQI−the smallest RSRP/RSRQ/CQI (i.e., Δ=largest RSRP/RSRQ/CQI−smallest RSRP/RSRQ/CQI).

In yet another example, the UE reports the strongest and the mean RSRP/RSRQ/CQI, accompanied with ordering of the N beams. In such example: the RSRP/RSRQ/CQI can be normal resolution or low resolution; the UE can be requested to report one largest RSRP/RSRQ/CQI and one mean RSRP/RSRQ/CQI which are calculated from the reported N beams; the UE can be request to report the largest RSRP/RSRQ/CQI value and the difference between largest RSRP/RSRQ/CQI−the mean RSRP/RSRQ/CQI (i.e., Δ=largest RSRP/RSRQ/CQI−mean RSRP/RSRQ/CQI); and/or the UE can be request to report the mean RSRP/RSRQ/CQI value and the difference between largest RSRP/RSRQ/CQI the mean RSRP/RSRQ/CQI (i.e., Δ=largest RSRP/RSRQ/CQI−mean RSRP/RSRQ/CQI).

In yet another example, the UE reports the strongest and the median RSRP/RSRQ/CQI, accompanied with ordering of the N beams. In such example; the RSRP/RSRQ/CQI can be normal resolution or low resolution; the UE can be request to report one largest RSRP/RSRQ/CQI and one median RSRP/RSRQ/CQI; the UE can be request to report the largest RSRP/RSRQ/CQI value and the difference between largest RSRP/RSRQ/CQI−the median RSRP/RSRQ/CQI (i.e., Δ=largest RSRP/RSRQ/CQI−median RSRP/RSRQ/CQI); and/or the UE can be request to report the smallest RSRP/RSRQ/CQI value and the difference between largest RSRP/RSRQ/CQI−the smallest RSRP/RSRQ/CQI (i.e., Δ=largest RSRP/RSRQ/CQI−median RSRP/RSRQ/CQI).

In yet another example, the UE reports the strongest RSRP/RSRQ/CQI, accompanied with ordering of the N reported beams and the number of beams out of N reported beams which have RSRP/RSRQ/CQI within a range with respect to the strongest RSRP/RSRQ/CQI.

In yet another example, the UE reports some events on the TRP beam quality. In such example, the indication of one configured TRP Tx beam's CQI/RSRP/RSRQ is above or below some threshold. In such example, the indication of whether one configured TRP Tx beam or CSI-RS resource has the highest CQI/RSRP/RSRQ among a set of indicated TRP Tx beams or CSI-RS resources. In such example, the number of TRP Tx beams or CSI-RS resources from a set of indicated TRP Tx beams or CSI-RS resources has higher CQI/RSRP/RSRQ than one configured TRP Tx beams or CSI-RS resources.

The UE report can be periodic and semi-persistent. For periodic report, the UE is configured with the report configuration described above through RRC signaling. For semi-persistent transmission, the UE is configured with the report configuration described above through RRC signaling and then the UE can be activated for the CSI report though activation signaling in MAC-CE and/or L1 signaling. The UE can be deactivated the CSI report through deactivation signaling in MAC-CE and/or L1 signaling.

In the following present disclosure based on the measurement on downlink reference signal, the CSI-RS would be used as an example for simplified discussion. The downlink reference signal can also be NR-SSS, BRS, BMRS, BRRS, MRS. The name of CSI-RS is exemplary and can be substituted with other names and labels without changing the substance of this embodiment. There exist multiple alternatives to map the reference signal resource to TRP Tx beams. In one example, one CSI-RS resource corresponds to one TRP Tx beam. In one example, a subset of one or more OFDM symbols can correspond to one TRP Tx beam. In one example a subset of RS antenna ports in frequency domain can correspond to one TRP Tx beam. In one example, the combination of OFDM symbol index and RS antenna port can correspond to one TRP Tx beams. Using one CSI-RS resource corresponding one TRP Tx beam in the following discussion is exemplary and can be substituted with other alternatives without changing the substance of the embodiments in the disclosures.

The UE can be configured with CSI-RS transmission with K CSI-RS resources. The CSI-RS transmission can be periodic or semi-persistent. In one embodiment, the UE can be requested to report the measurement quality of one indicated CSI-RS resource. This method is useful to the UE to monitor and report the quality of one TRP Tx beam (for example the associated coverage beam) periodically to assist the gNB to determine the beam switch. In this method, the UE can be configured with the following information: the index of one CSI-RS resource among K CSI-RS resources; and/or the measurement content the UE is requested to report, for example the CQI, RSRP, RSRQ or some event.

In one example, the UE can be requested to measure and report the RSRP of the indicated CSI-RS resource. An example of RSRP with 1 dB resolution is shown in TABLE 1.

TABLE 1

| \multicolumn{3}{c}{RSRP with 1 dB resolution} | | |
| --- | --- | --- |
| Reported value | Measured quantity value | Unit |
| RSRP_0 | RSRP < −140 | dBm |
| RSRP_1 | −140 ≤ RSRP < −139 | dBm |
| ... | ... | ... |
| RSRP_97 | −44 ≤ RSRP | dBm |

In one example, the UE can be requested to measure and report the low resolution RSRQ of the indicated CSI-RS resources. An example of low resolution RSRP is shown in TABLE 2, TABLE 3, TABLE 4, and TABLE 5. In TABLE 2, the RSRP has 2 dB resolution. In TABLE 3, the RSRP has 4 dB resolution. In TABLE 4, the RSRP has 5 dB resolution. In TABLE 5, the RSRP has 10 dB resolution.

TABLE 2

| RSRP with 2 dB resolution | | |
| --- | --- | --- |
| Reported value | Measured quantity value | Unit |
| RSRP_0 | RSRP < −140 | dBm |
| RSRP_1 | −140 ≤ RSRP < −138 | dBm |
| ... | ... | ... |
| RSRP_48 | −46 ≤ RSRP < −44 | |
| RSRP_49 | −44 ≤ RSRP | dBm |

TABLE 3

| RSRP with 4 dB resolution | | |
| --- | --- | --- |
| Reported value | Measured quantity value | Unit |
| RSRP_0 | RSRP < −140 | dBm |
| RSRP_1 | −140 ≤ RSRP < −136 | dBm |
| ... | ... | ... |
| RSRP_24 | −48 ≤ RSRP < −44 | dBm |
| RSRP_25 | −44 ≤ RSRP | dBm |

TABLE 4

| RSRP with 5 dB resolution | | |
| --- | --- | --- |
| Reported value | Measured quantity value | Unit |
| RSRP_0 | RSRP < −140 | dBm |
| RSRP_1 | −140 ≤ RSRP < −135 | dBm |
| ... | ... | ... |
| RSRP_19 | −50 ≤ RSRP < −45 | dBm |
| RSRP_20 | −45 ≤ RSRP | dBm |

TABLE 5

| RSRP with 10 dB resolution | | |
| --- | --- | --- |
| Reported value | Measured quantity value | Unit |
| RSRP_0 | RSRP < −140 | dBm |
| RSRP_1 | −140 ≤ RSRP < −130 | dBm |
| ... | ... | ... |
| RSRP_10 | −50 ≤ RSRP < −40 | dBm |
| RSRP_11 | −40 ≤ RSRP | dBm |

In one example, the UE can be requested to measure and report the RSRQ of the indicated CSI-RS resource. An example of RSRP with 0.5 dB resolution is shown in TABLE 6.

TABLE 6

| RSRP with 0.5 dB resolution | | |
| --- | --- | --- |
| Reported value | Measured quantity value | Unit |
| RSRQ_0 | RSRQ < −19.5 | dB |
| RSRQ_1 | −19.5 ≤ RSRQ < −19 | dB |
| ... | ... | ... |
| RSRQ_33 | −3.5 ≤ RSRQ < −3 | dB |
| RSRQ_34 | −3 ≤ RSRQ | dB |

In one example, the UE can be requested to measure and report the low resolution RSRQ of the indicated CSI-RS resources. An example of low resolution RSRQ is shown in TABLE 7, TABLE 8, TABLE 9, and TABLE 10. In TABLE 7, the RSRQ has 1 dB resolution. In TABLE 8, the RSRQ has 2 dB resolution. In TABLE 9, the RSRQ has 3 dB resolution. In TABLE 10, the RSRQ has 5 dB resolution.

TABLE 7

RSRQ with 1 dB resolution

| Reported value | Measured quantity value | Unit |
|---|---|---|
| RSRQ_0 | RSRQ <−20 | dB |
| RSRQ_1 | −20 ≤ RSRQ < −19 | dB |
| ... | ... | ... |
| RSRQ_17 | −4 ≤ RSRQ < −3 | dB |
| RSRQ_18 | −3 ≤ RSRQ | dB |

TABLE 8

RSRQ with 2 dB resolution

| Reported value | Measured quantity value | Unit |
|---|---|---|
| RSRQ_0 | RSRQ <−20 | dB |
| RSRQ_1 | −20 ≤ RSRQ < −18 | dB |
| ... | ... | ... |
| RSRQ_10 | −4 ≤ RSRQ < −2 | dB |
| RSRQ_11 | −2 ≤ RSRQ | dB |

TABLE 9

RSRQ with 3 dB resolution

| Reported value | Measured quantity value | Unit |
|---|---|---|
| RSRQ_0 | RSRQ <−20 | dB |
| RSRQ_1 | −20 ≤ RSRQ < −17 | dB |
| ... | ... | ... |
| RSRQ_6 | −5 ≤ RSRQ < −2 | dB |
| RSRQ_7 | −2 ≤ RSRQ | dB |

TABLE 10

RSRQ with 5 dB resolution

| Reported value | Measured quantity value | Unit |
|---|---|---|
| RSRQ_0 | RSRQ <−20 | dB |
| RSRQ_1 | −20 ≤ RSRQ < −15 | dB |
| ... | ... | ... |
| RSRQ_3 | −10 ≤ RSRQ < −5 | dB |
| RSRQ_4 | −5 ≤ RSRQ | dB |

In one example, the UE can be requested to report the comparison of measured CQI/RSRP/RSRQ of one indicated CSI-RS resource with one configured threshold. The UE can be configured with a threshold value for CQI, RSRP or RSRQ. And the UE is requested to first measure the CQI/RSRP/RSRQ of the indicated CSI-RS resource and then report the comparison result between measurement and the configured threshold. For example the UE can be configured to report 1 bit information. The 1 bit 0 indicates that the CQI/RSRP/RSRP measured from the indicated CSI-RS resource is above or equal to the configured threshold. The 1 bit=1 indicates that the CQI/RSRP/RSRP measured from the indicated CSI-RS resource is below to the configured threshold.

In one example, the UE can be requested to report the offset of measured CQI/RSRP/RSRQ of one indicated CSI-RS resource with respect to one configured threshold. The UE can be configured to report the value of measured CQI/RSRP/RSRQ configured threshold.

In one embodiment, the UE can be configured to report relative strength of M indicated CSI-RS resources periodically or semi-persistently. This method would be useful to the gNB to configure the UE to monitor one serving beam and also a few candidate beams. The UE can be configured to report the CQI/RSRP/RSRQ of one serving beam and the relative strength of M indicated CSI-RS resources. In this method, the UE can be configured with: index of one CSI-RS resource, which can be considered as the reference CSI-RS resource. One example for that is the CSI-RS corresponding to the serving beam; and/or a set of M−1 indices of CSI-RS resources.

The UE can be requested to measure the indicated M CSI-RS resources and report the relative strength of M−1 CSI-RS resource with respect to the indicated reference CSI-RS resource.

In one embodiment, the UE can be configured to report beam strength ordering of M indicated CSI-RS resources periodically or semi-persistently. The UE can be configured with a set of M indices of CSI-RS resources $\{C_{i1}, C_{i2}, \ldots, C_{iM}\}$.

The UE can be requested to measure the indicated M CSI-RS resources and then report a sorted CSI-RS resource index. The ordering of CSI-RS resource indices can be used as indication of relative strength of M indicated CSI-RS resources. The indices of CSI-RS resource can be absolute index of CSI-RS or the index of CSI-RS resource in the indicated set.

In one embodiment, the UE can be configured to report the events of one indicated CSI-RS resources. This method is useful to the gNB to configure the UE to monitor the behavior of one serving beams. The UE can be configured to report one of the following event: the indicated CSI-RS resource has the highest CQI/RSRP/RSRQ among a set of M indicated CSI-RS resources $C_{i1}, C_{i2}, \ldots, C_{iM}$; one CSI-RS resources in a set of M indicated CSI-RS resources $C_{i1}, C_{i2}, \ldots, C_{iM}$ has higher CQI/RSRP/RSRQ than the indicated reference CSI-RS resources; one or more CSI-RS resources in a set of M indicated CSI-RS resources $C_{i1}, C_{i2}, \ldots, C_{iM}$ has higher CQI/RSRP/RSRQ than the indicated reference CSI-RS resources; the CQI/RSRP/RSRQ of the indicated reference CSI-RS resource is above a configured threshold; and/or the CQI/RSRP/RSRQ of the indicated reference CSI-RS resource is below a configured threshold.

In some embodiments, the UE can be configured to measure the NR-SSS and reported the measurement periodically and semi-persistent. In some embodiments, the UE can be configured to measure and report the CQI/RSRP/RSRQ of NR-PBCH periodically and semi-persistent. The aforementioned embodiment discussed above can be applied here. In multi-beam based system, the NR-SSS and NR-PBCH are transmitted with a Tx beam sweeping manner. The UE can be configured to monitor one NR-SSS slot or NR-PBCH symbol corresponding to one TRP Tx beam and reported the measurement content as discussed in the aforementioned embodiments.

In some embodiments, the UE can be configured to measure, monitor and report signal quality of NR-PDCCH in periodic or semi-persistent CSI report. This method is useful for the gNB to configure the UE to monitor the link quality and coverage beam quality on NR-PDCCH. The UE can be configured with the NR-PDCCH locations where the UE may measure the CQI/RSRP/RSRQ of the NR-PDCCH, for example, the list of slot indices in which the UE may try to measure the NR-PDCCH. In such instance, the configuration can also include the symbol index or resource index where the UE may measure. The UE can be configured with the measurement and report content, e.g., CQI, RSRP, RSRQ, low resolution RSRP, low resolution RSRQ.

In some embodiments, the UE can be configured to report the measurement results on some NR-PDSCH in periodical or semi-persistent CSI report.

In the present disclosure, CSI-RS resource index is use exemplary for easy explanation. It can be replaced with one beam, one beam ID, {CSI-RS resource index, port index}, {CSI-RS resource index, port set index}, {CSI-RS resource index, port index, RS setting index} without changing the embodiments.

In one embodiment, the UE can be configured a CSI-RS transmission with K CSI-RS resources. The UE can be requested to report the indices of N CSI-RS resources out of K configured CSI-RS resources. The value of N can be 1 or more than one. The N can be configured by higher layer (e.g., RRC, SIB) or preconfigured or through MAC-CE or L1 signaling (e.g., DCI). The UE can be configured with the K CSI-RS resources, whose indices are $\{C_1, C_2, \ldots, C_K\}$. In embodiment, the UE can be requested to report one or more of the followings.

In one example, the UE reports a set of N CSI-RS resource indices CRI=$\{C_{i1}, C_{i2}, \ldots, C_{iN}\}$. These N CSI-RS resources are selected from K configured CSI-RS $\{C_1, C_2, \ldots, C_K\}$. The ordering of CSI-RS resource indices in CRI=$\{C_{i1}, C_{i2}, \ldots, C_{iN}\}$ indicates the relative RSRP (or RSRQ, CQI) information of those N reported CSI-RS resource indices. In such example, the CSI-RS indices in CRI=$\{C_{i1}, C_{i2}, \ldots, C_{iN}\}$ are sorted in an ascending order. The RSRP (or RSRQ, or CQI) of CSI-RS resource $C_{i1}$ is less than or equal to the RSRP (or RSRQ, or CQI) of CSI-RS resource $C_{i2}$; The RSRP (or RSRQ, or CQI) of CSI-RS resource $C_{i2}$ is less than or equal to the RSRP (or RSRQ, or CQI) of CSI-RS resource $C_{i3}$; and so on. The RSRP (or RSRQ, or CQI) of CSI-RS resource $C_{iN}$ is the largest among the N reported CSI-RS resources in CRI=$\{C_{i1}, C_{i2}, \ldots, C_{iN}\}$ and RSRP (or RSRQ, or CQI) of CSI-RS resource $C_{i1}$ is the smallest among the N reported CSI-RS resources in CRI=$\{C_{i1}, C_{i2}, \ldots, C_{iN}\}$. In such example, the CSI-RS indices in CRI=$\{C_{i1}, C_{i2}, \ldots, C_{iN}\}$ are sorted in a descending order. The RSRP (or RSRQ, or CQI) of CSI-RS resource $C_{i1}$ is larger than or equal to the RSRP (or RSRQ, or CQI) of CSI-RS resource $C_{i2}$; The RSRP (or RSRQ, or CQI) of CSI-RS resource $C_{i2}$ is larger than or equal to the RSRP (or RSRQ, or CQI) of CSI-RS resource $C_{i3}$; and so on. The RSRP (or RSRQ, or CQI) of CSI-RS resource $C_{i1}$ is the largest among the N reported CSI-RS resources in CRI=$\{C_{i1}, C_{i2}, \ldots, C_{iN}\}$ and the RSRP (or RSRQ, or CQI) of CSI-RS resource $C_{iN}$ is the smallest among the N reported CSI-RS resources in CRI=$\{C_{i1}, C_{i2}, \ldots, C_{iN}\}$.

In another example, the UE reports the RSRP (can also be RSRQ or CQI) of one CSI-RS resource out of N reported CSI-RS resources. In such example, the reported RSRP (can also be RSRQ or CQI) can be the RSRP (or RSRQ or CQI) of CSI-RS resource $C_{iN}$ of the reported N CSI-RS resource $\{C_{i1}, C_{i2}, \ldots, C_{iN}\}$ in the case of N CSI-RS resource indices in $\{C_{i1}, C_{i2}, \ldots, C_{iN}\}$ is in ascending order. In such example, the reported RSRP (can also be RSRQ or CQI) is the RSRP (or RSRQ or CQI) of CSI-RS resource $C_{i1}$ of the reported N CSI-RS resource $\{C_{i1}, C_{i2}, \ldots, C_{iN}\}$ in the case of N CSI-RS resource indices in $\{C_{i1}, C_{i2}, \ldots, C_{iN}\}$ is in descending order.

In yet another example, the UE reports two RSRP values (or RSRQ or CQI) of two CSI-RS resources out of N reported CSI-RS resources. In such example, in the case of N CSI-RS resource indices in $\{C_{i1}, C_{i2}, \ldots, C_{iN}\}$ is in ascending order, the two reported RSRP (can also be RSRQ or CQI) values can be the RSRP of CSI-RS resource $C_{i1}$ and $C_{iN}$ of the reported N CSI-RS resources $\{C_{i1}, C_{i2}, \ldots, C_{iN}\}$. In such example, in the case of N CSI-RS resource indices in $\{C_{i1}, C_{i2}, \ldots, C_{iN}\}$ is in descending order, the two reported RSRP (can also be RSRQ or CQI) values can be the RSRP of CSI-RS resource $C_{i1}$ and $C_{iN}$ of the reported N CSI-RS resources $\{C_{i1}, C_{i2}, \ldots, C_{iN}\}$. In such example, the UE can be requested to report two values. A first value is the RSRP of CSI-RS resource that has the largest RSRP. A second value is the $\Delta$=the largest RSRP of CSI-RS resources in $\{C_{i1}, C_{i2}, \ldots, C_{iN}\}$–the smallest RSRP of CSI-RS resources in $\{C_{i1}, C_{i2}, \ldots, C_{iN}\}$. In such example, the UE can be requested to report two values. A first value is the RSRP of CSI-RS resource that has the smallest RSRP. A second value is the $\Delta$=the largest RSRP of CSI-RS resources in $\{C_{i1}, C_{i2}, \ldots, C_{iN}\}$– the smallest RSRP of CSI-RS resources in $\{C_{i1}, C_{i2}, \ldots, C_{iN}\}$.

In yet another example, the UE reports the RSRP (can also be RSRQ or CQI) of one CSI-RS resource out of N reported CSI-RS resources and one mean of RSRPs of all N reported CSI-RS resources. In such example, in the case of N CSI-RS resource indices in $\{C_{i1}, C_{i2}, \ldots, C_{iN}\}$ is in ascending order, the reported RSRP (can also be RSRQ or CQI) value can be the RSRP of CSI-RS resource $C_{iN}$. The mean of RSRP is the mean of RSRP of all N reported CSI-RS resources $\{C_{i1}, C_{i2}, \ldots, C_{iN}\}$. In such example, in the case of N CSI-RS resource indices in $\{C_{i1}, C_{i2}, \ldots, C_{iN}\}$ is in descending order, the reported RSRP (can also be RSRQ or CQI) value can be the RSRP of CSI-RS resource $C_{i1}$. The mean of RSRP is the mean of RSRP of all N reported CSI-RS resources $\{C_{i1}, C_{i2}, \ldots, C_{iN}\}$. In such example, the UE can be requested to report two values. A first value is the RSRP of CSI-RS resource that has the largest RSRP. A second value is the $\Delta$=the largest RSRP of CSI-RS resources in $\{C_{i1}, C_{i2}, \ldots, C_{iN}\}$– the mean of RSRP of all CSI-RS resources in $\{C_{i1}, C_{i2}, \ldots, C_{iN}\}$. In such example, the UE can be requested to report two values. A first value is the mean RSRP of CSI-RS resources in $\{C_{i1}, C_{i2}, \ldots, C_{iN}\}$. A second value is the $\Delta$=the largest RSRP of CSI-RS resources in $\{C_{i1}, C_{i2}, \ldots, C_{iN}\}$– the mean of RSRP of all CSI-RS resources in $\{C_{i1}, C_{i2}, \ldots, C_{iN}\}$.

In yet another example, the UE reports the RSRP (can also be RSRQ or CQI) of one CSI-RS resource out of N reported CSI-RS resources and the median of RSRPs of all N reported CSI-RS resources. In such example, in the case of N CSI-RS resource indices in $\{C_{i1}, C_{i2}, \ldots, C_{iN}\}$ is in ascending order, the reported RSRP (can also be RSRQ or CQI) value can be the RSRP of CSI-RS resource $C_{iN}$. The median of RSRP is the median of RSRP of all N reported CSI-RS resources $\{C_{i1}, C_{i2}, \ldots, C_{iN}\}$. In such example, in the case of N CSI-RS resource indices in $\{C_{i1}, C_{i2}, \ldots, C_{iN}\}$ is in descending order, the reported RSRP (can also be RSRQ or CQI) value can be the RSRP of CSI-RS resource $C_{L1}$. The median of RSRP is the median of RSRP of all N reported CSI-RS resources $\{C_{i1}, C_{i2}, \ldots, C_{iN}\}$. In such example, the UE can be requested to report two values. A first value is the RSRP of CSI-RS resource that has the largest RSRP. A second value is the $\Delta$=the largest RSRP of CSI-RS resources in $\{C_{i1}, C_{i2}, \ldots, C_{iN}\}$– the median RSRP of CSI-RS resources in $\{C_{i1}, C_{i2}, \ldots, C_{iN}\}$. In such example, the UE can be requested to report two values. A first value is the median RSRP of CSI-RS resources $\{C_{i1}, C_{i2}, \ldots, C_{iN}\}$. A second value is the $\Delta$=the largest RSRP of CSI-RS resources in $\{C_{i1}, C_{i2}, \ldots, C_{iN}\}$– the median RSRP of CSI-RS resources in $\{C_{i1}, C_{i2}, \ldots, C_{iN}\}$.

In yet another example, the UE reports the RSRP (can also be RSRQ or CQI) of one CSI-RS resource out of N reported CSI-RS resources and a number of CSI-RS resources, R, out of N reported CSI-RS resources. In such example, the reported RSRP (can also be RSRQ or CQI) can be the RSRP (or RSRQ or CQI) of CSI-RS resource $C_{iN}$ of the reported N CSI-RS resource $\{C_{i1}, C_{i2}, \ldots, C_{iN}\}$ in the case of N CSI-RS resource indices in $\{C_{i1}, C_{i2}, \ldots, C_{iN}\}$ is in ascending order. The value of R can be the number of CSI-RS resources out of $\{C_{i1}, C_{i2}, \ldots, C_{iN-1}\}$ whose RSRP (or RSRQ or CQI) is more than RSRP of CSI-RS resource $C_{iN}$-offsetX. In such example, the reported RSRP (can also be RSRQ or CQI) can be the RSRP (or RSRQ or CQI) of CSI-RS resource $C_{i1}$ of the reported N CSI-RS resource $\{C_{i1}, C_{i2}, \ldots, C_{iN}\}$ in the case of N CSI-RS resource indices in $\{C_{i1}, C_{i2}, \ldots, C_{iN}\}$ is in descending order. The value of R can be the number of CSI-RS resources out of $\{C_{i1}, C_{i2}, \ldots, C_{iN-1}\}$ whose RSRP (or RSRQ or CQI) is more than RSRP of CSI-RS resource $C_{i1}$-offsetX. In such example, the offset value offsetX can be configured through higher layer message, MAC-CE or L1 signaling or preconfigured.

In yet another example, the UE can be requested to report N values along with N reported CSI-RS resource indices. In one instance, the UE can be requested to report N RSPP values $\{P_1, P_2, \ldots, P_N\}$, which correspond to N reported CSI-RS resource indices $\{C_{i1}, C_{i2}, \ldots, C_{iN}\}$. In the report, $P_j$ is the RSRP for CSI-RS resource index $C_{ij}$ with $j=1, 2, \ldots, N$. In one instance, the UE can report N CSI-RS resource indices in $\{C_{i1}, C_{i2}, \ldots, C_{iN}\}$ where indices are sorted in ascending order based on RSRP (RSRQ, CQI). The UE can report $\{\Delta_1, \Delta_2, \ldots, \Delta_{N-1}\}$ and $P_N$. $P_N$ is the RSRP of CSI-RS resource $C_{iN}$. And the $\Delta_j$ is the difference between RSRP of CSI-RS resource $C_{ij}$ and the RSRP of CSI-Rs resource $C_{iN}$. In one instance, the UE can report N CSI-RS resource indices in $\{C_{i1}, C_{i2}, \ldots, C_{iN}\}$ where indices are sorted in descending order based on RSRP (RSRQ, CQI). The UE can report $\{\Delta_2, \Delta_3, \ldots, \Delta_N\}$ and $P_1$. $P_1$ is the RSRP of CSI-RS resource $C_{i1}$. And the $\Delta_j$ is the difference between RSRP of CSI-RS resource $C_{i1}$ and the RSRP of CSI-Rs resource $C_{i1}$. In one instance, the UE can report N CSI-RS resource indices in $\{C_{i1}, C_{i2}, \ldots, C_{iN}\}$ where indices are sorted in descending order based on RSRP (RSRQ, CQI). The UE can report $\{\Delta_1, \Delta_2, \ldots, \Delta_{N-1}\}$ and $P_N$. $P_N$ is the RSRP of CSI-RS resource $C_{iN}$. And the $\Delta_j$ is the difference between RSRP of CSI-RS resource $C_{ij}$ and the RSRP of CSI-Rs resource $C_{iN}$. In one instance, the UE can report N CSI-RS resource indices in $\{C_{i1}, C_{i2}, \ldots, C_{iN}\}$ where indices are sorted in descending order based on RSRP (RSRQ, CQI). The UE can report $\{\Delta_2, \Delta_3, \ldots, \Delta_N\}$ and $P_1$. $P_1$ is the RSRP of CSI-RS resource $C_{i1}$. And the $\Delta_j$ is the difference between RSRP of CSI-RS resource $C_{ij}$ and the RSRP of CSI-Rs resource $C_{i1}$.

In one embodiment, the UE can be requested to report the largest RSRP (or smallest RSRP or some RSRP as the reference) and differential RSRP of multiple beams (e.g., CSI resource indices) with same resolution but different bit width. In one method, the UE can be requested to the largest RSRP (or smallest RSRP or some RSRP as the reference) with bit width being $B_1$ bits and the UE can be requested to report the differential RSRPs with resolution being $B_2$ bits. In one example, $B1_1$ can be 7 bits and $B_2$ can be 3 bits. This is useful to optimize the beam reporting mechanism. The largest RSRP/smallest RSRP or reference RSRP is absolute value and thus a larger bit width can provide a larger value range. However, differential RSRP is expected to have smaller value range and thus a shorter bit width can be used for differential RSRP to reduce the overhead.

In one embodiment, the UE can be requested to report the largest RSRP (or smallest RSRP or some RSRP as the reference) and differential RSRP of multiple beams (e.g., CSI resource indices) with different resolution. In one method, the UE can be requested to the largest RSRP (or smallest RSRP or some RSRP as the reference) with resolution being $X_1$ dB and the UE can be requested to report the differential RSRPs with resolution being $X_2$ dB. In one example, $X_1$ can be 3 dB and $X_2$ can be 1 dB. This is useful to optimize the beam reporting mechanism. The largest RSRP/smallest RSRP or reference RSRP is absolute value and thus a low resolution can provide the information of rough RSRP level. However, differential RSRP with higher dB resolution can provide more accurate information about the difference among the reported CSI-RS resources or beams. An example of differential RSRP with 2 dB resolution and 4 bits is shown in TABLE 11.

TABLE 11

| Differential RSRP with 2 dB resolution and 4-bit length | |
| --- | --- |
| Reported value | Measured quantity value |
| 0000 | 0 dB ≥ differential L1-RSRP > −2 dB |
| 0001 | −2 dB ≥ differential L1-RSRP > −4 dB |
| ... | ... |
| 1111 | −30 dB ≤ differential L1-RSRP |

A shown in TABLE 11, the value of 1111 can be also called as "out-of-range" or "no-valid-value," which can indicate that the RSRP is more than 30 dB lower than the reference RSRP.

In one embodiment, the UE can be requested to report N×C bits $\{b_1b_2b_3b_4 \ldots b_C \ldots b_{N\times C}\}$ for the reporting of N CSI-RS resource indices or beam IDs. Each C bits inside those reported bits represents on CSI-RS resource index or beam ID. In one example, bits $b_1b_2b_3b_4 \ldots b_C$ can represent the index of CSI-RS resource or beam ID whose reported RSRP/RSRQ is the reference RSRP/RSRQ for the differential RSRP of multiple beams in the report. It can be CSI-RS resource or beam ID with the largest or smallest RSRP/RSRQ/CQI among all N reported CSI-RS resource or beams. In one method, the UE can be requested to report $B_1+(N-1)\times B_2$ bits for the reporting of RSRP or RSRQ of N reported CSI-RS resource indices or beams. In the reported bit map $\{q_1q_2q_3q_4 \ldots q_{B1} \ldots q_{B1+(N-1)\times B2}\}$, the bits $q_1q_2q_3q_4 \ldots q_{B1}$ can represent the RSRP/RSRQ of CSI-RS resource index or beam ID represented by bits $b_1 \ldots b_C$. The bits $q_{B1+1} \ldots q_{B1+B2}$ can represent the differential RSRP/RSRQ of CSI-RS resource index or beam ID represented by bits $b_{C+1} \ldots b_{2\times C}$. The bits $q_{B1+B2+1} \ldots q_{B1+2\times B2}$ can represent the differential RSRP/RSRQ of CSI-RS resource index or beam ID represented by bits $b_{2\times C+1} \ldots b_{3\times C}$, and so on so forth. The bits $q_{B1+(N-2)\times B2+1} \ldots q_{B1+(N-1)\times B2}$ can represent the differential RSRP/RSRQ of CSI-RS resource index or beam ID represented by bits $b_{(N-1)\times C+1} \ldots b_{N\times C}$.

In one embodiment, the UE can be requested to report N×C bits $\{b_1b_2b_3b_4 \ldots b_C \ldots b_{N\times C}\}$ for the reporting of N CSI-RS resource indices or beam IDs. Each C bits inside those reported bits represents on CSI-RS resource index or beam ID. In one example, bits $b_{(N-1)\times C+1} \ldots b_{N\times C}$ can represent the index of CSI-RS resource or beam ID whose reported RSRP/RSRQ is the reference RSRP/RSRQ for the differential RSRP of multiple beams in the report. It can be CSI-RS resource or beam ID with the largest or smallest RSRP/RSRQ/CQI among all N reported CSI-RS resource or beams. In one method, the UE can be requested to report $B_1+(N-1)\times B_2$ bits for the reporting of RSRP or RSRQ of N reported CSI-RS resource indices or beams. In the reported bit map $\{q_1q_2q_3q_4 \ldots q_{B1} \ldots q_{B1+(N-1)\times\times B2}\}$, the bits $\{q_{B1+(N-1)\times B2-B1+1} \ldots q_{B1+(N-1)\times B2}\}$ can represent the RSRP/RSRQ of CSI-RS resource index or beam ID represented by bits $b_{(N-1)\times C+1} \ldots b_{N\times C}$. The bits $q_1 \ldots q_{B2}$ can represent the differential RSRP/RSRQ of CSI-RS resource index or beam ID represented by bits $b_1 \ldots b_C$. The bits $q_{B2+1} \ldots q_{2\times B2}$ can represent the differential RSRP/RSRQ of CSI-RS resource index or beam ID represented by bits $b_{C+1} \ldots b_{2\times C}$, and so on so forth. The bits $q_{(N-2)\times B2+1} \ldots q_{(N-1)\times B2}$ can represent the differential RSRP/RSRQ of CSI-RS resource index or beam ID represented by bits $b_{(N-2)\times C+1} \ldots b_{(N-1)\times C}$.

In one embodiment, the bit payload for reporting N=1 CRI or SSB index can be $\{b_1 b_2 b_3 b_4 \ldots b_{13}\}$, where a 6 bit value is used for CRI or SSB index and 7 bit value is used for L1-RSRP. In one example, the bits of $\{b_1 b_2 b_3 b_4 \ldots b_6\}$ is the reported CRI or SSB index and the bits of $\{b_7 b_8 \ldots b_{13}\}$ is the value of L1-RSRP measured from CRI or SSB index represented by bits $\{b_1 b_2 b_3 b_4 \ldots b_6\}$. In one example, the bits of $\{b_8 b_9 \ldots b_{13}\}$ is the reported CRI or SSB index and the bits of $\{b_1 b_2 b_3 b_4 \ldots b_7\}$ is the value of L1-RSRP measured from CRI or SSB index represented by bits $\{b_8 b_9 \ldots b_{13}\}$.

In one embodiment, the bit payload for reporting N=2 CRIs or SSB indices can be $\{b_1 b_2 b_3 b_4 \ldots b_{23}\}$, where a 6 bit value is used for CRI or SSB index, a 7 bit value is used for L1-RSRP and 4 bits is used for differential L1-RSRP. The UE reports a first CRI or SSB index and a second CRI or SSB index. Assuming the L1-RSRP of a first CRI and SSB index is the largest among the L1-RSRP of a first CRI or SSB index and a second CRI or SSB index. One or more of the following examples can be used.

In one example, the bits $\{b_1 b_2 b_3 b_4 \ldots b_6\}$ is the reported a first CRI or SSB index, the bits $\{b_7 \ldots b_{13}\}$ is the L1-RSRP of a first CRI or SSB index, the bits $\{b_{14} \ldots b_{19}\}$ is the reported a second CRI or SSB index, and the bits $\{b_{20} \ldots b_{23}\}$ is the differential L1-RSRP of a second CRI or SSB index using the L1-RSRP of a first CRI or SSB index as the reference.

In another example, the bits $\{b_1 \ldots b_7\}$ is the L1-RSRP of reported a first CRI or SSB index, the bits $\{b_8 \ldots b_{13}\}$ is the reported a first CRI or SSB index, the bits $\{b_{18} \ldots b_{23}\}$ is the reported a second CRI or SSB index, and the bits $\{b_{14} \ldots b_{17}\}$ is the differential L1-RSRP of a second CRI or SSB index using the L1-RSRP of a first CRI or SSB index as the reference.

In yet another example, the bits $\{b_{18} \ldots b_{23}\}$ is the reported a first CRI or SSB index, the bits $\{b_{11} \ldots b_{17}\}$ is the L1-RSRP of a first CRI or SSB index, the bits $\{b_5 \ldots b_{10}\}$ is the reported a second CRI or SSB index, and the bits $\{b_1 \ldots b_4\}$ is the differential L1-RSRP of a second CRI or SSB index using the L1-RSRP of a first CRI or SSB index as the reference.

In yet another example, the bits $\{b_{11} \ldots b_{16}\}$ is the reported a first CRI or SSB index, the bits $\{b_{17} \ldots b_{23}\}$ is the L1-RSRP of a first CRI or SSB index, the bits $\{b_1 \ldots b_6\}$ is the reported a second CRI or SSB index, and the bits $\{b_7 \ldots b_{10}\}$ is the differential L1-RSRP of a second CRI or SSB index using the L1-RSRP of a first CRI or SSB index as the reference.

In yet another example, the bits $\{b_1 \ldots b_6\}$ is the reported a first CRI or SSB index, the bits $\{b_{13} \ldots b_{19}\}$ is the L1-RSRP of a first CRI or SSB index, the bits $\{b_7 \ldots b_{12}\}$ is the reported a second CRI or SSB index, and the bits $\{b_{20} \ldots b_{23}\}$ is the differential L1-RSRP of a second CRI or SSB index using the L1-RSRP of a first CRI or SSB index as the reference.

In yet another example, the bits $\{b_{18} \ldots b_{23}\}$ is the reported a first CRI or SSB index, the bits $\{b_5 \ldots b_{11}\}$ is the L1-RSRP of a first CRI or SSB index, the bits $\{b_{12} \ldots b_{17}\}$ is the reported a second CRI or SSB index, and the bits $\{b_1 \ldots b_4\}$ is the differential L1-RSRP of a second CRI or SSB index using the L1-RSRP of a first CRI or SSB index as the reference.

In yet another example, the bits $\{b_7 \ldots b_{12}\}$ is the reported a first CRI or SSB index, the bits $\{b_{13} \ldots b_{16}\}$ is the L1-RSRP of a first CRI or SSB index, the bits $\{b_1 \ldots b_6\}$ is the reported a second CRI or SSB index, and the bits $\{b_{17} \ldots b_{23}\}$ is the differential L1-RSRP of a second CRI or SSB index using the L1-RSRP of a first CRI or SSB index as the reference.

In yet another example, the bits $\{b_{12} \ldots b_{17}\}$ is the reported a first CRI or SSB index, the bits $\{b_1 \ldots b_7\}$ is the L1-RSRP of a first CRI or SSB index, the bits $\{b_{18} \ldots b_{23}\}$ is the reported a second CRI or SSB index, and the bits $\{b_8 \ldots b_{11}\}$ is the differential L1-RSRP of a second CRI or SSB index using the L1-RSRP of a first CRI or SSB index as the reference.

In one embodiment, the bit payload for reporting N=4 CRIs or SSB indices can be $\{b_1 b_2 b_3 b_4 \ldots b_{43}\}$, where a 6 bit value is used for CRI or SSB index, a 7 bit value is used for L1-RSRP and 4 bits is used for differential L1-RSRP. The UE reports a first CRI or SSB index, a second CRI or SSB index, a third CRI or SSB index, and a fourth CRI or SSB index. Assuming the L1-RSRP of a first CRI and SSB index is the largest among the L1-RSRP of {a first CRI or SSB index, a second CRI or SSB index, a third CRI or SSB index, and a forth CRI or SSB index}. One or more of the following example can be used.

In one example, the bits $\{b_1 \ldots b_6\}$ is the reported a first CRI or SSB index, the bits $\{b_7 \ldots b_{13}\}$ is the L1-RSRP of a first CRI or SSB index, the bits $\{b_{14} \ldots b_{19}\}$ is the reported a second CRI or SSB index, and the bits $\{b_{20} \ldots b_{23}\}$ is the differential L1-RSRP of a second CRI or SSB index using the L1-RSRP of a first CRI or SSB index as the reference, the bits $\{b_{24} \ldots b_{29}\}$ is the reported a third CRI or SSB index, and the bits $\{b_{30} \ldots b_{33}\}$ is the differential L1-RSRP of a third CRI or SSB index using the L1-RSRP of a first CRI or SSB index as the reference; the bits $\{b_{34} \ldots b_{39}\}$ is the reported a fourth CRI or SSB index, and the bits $\{b_{40} \ldots b_{43}\}$ is the differential L1-RSRP of a fourth CRI or SSB index using the L1-RSRP of a first CRI or SSB index as the reference.

In another example, the bits $\{b_1 \ldots b_7\}$ is the L1-RSRP of reported a first CRI or SSB index, the bits $\{b_8 \ldots b_{13}\}$ is the reported a first CRI or SSB index, the bits $\{b_{18} \ldots b_{23}\}$ is the reported a second CRI or SSB index, and the bits $\{b_{14} \ldots b_{17}\}$ is the differential L1-RSRP of a second CRI or SSB index using the L1-RSRP of a first CRI or SSB index as the reference. the bits $\{b_{28} \ldots b_{33}\}$ is the reported a third CRI or SSB index, and the bits $\{b_{24} \ldots b_{27}\}$ is the differential L1-RSRP of a third CRI or SSB index using the L1-RSRP of a first CRI or SSB index as the reference; the bits $\{b_{38} \ldots b_{43}\}$ is the reported a fourth CRI or SSB index, and the bits $\{b_{34} \ldots b_{37}\}$ is the differential L1-RSRP of a fourth CRI or SSB index using the L1-RSRP of a first CRI or SSB index as the reference.

In yet another example, the bits $\{b_{38} \ldots b_{43}\}$ is the reported a first CRI or SSB index, the bits $\{b_{31} \ldots b_{37}\}$ is the L1-RSRP of a first CRI or SSB index, the bits $\{b_{25} \ldots b_{30}\}$ is the reported a second CRI or SSB index, and the bits $\{b_{21} \ldots b_{24}\}$ is the differential L1-RSRP of a second CRI or SSB index using the L1-RSRP of a first CRI or SSB index as the reference. the bits $\{b_{15} \ldots b_{20}\}$ is the reported a third CRI or SSB index, and the bits $\{b_{11} \ldots b_{14}\}$ is the differential L1-RSRP of a third CRI or SSB index using the L1-RSRP of a first CRI or SSB index as the reference. the bits $\{b_5 \ldots b_{10}\}$ is the reported a fourth CRI or SSB index, and the bits $\{b_1 \ldots b_4\}$ is the differential L1-RSRP of a fourth CRI or SSB index using the L1-RSRP of a first CRI or SSB index as the reference.

In yet another example, the bits $\{b_{31} \ldots b_{36}\}$ is the reported a first CRI or SSB index, the bits $\{b_{37} \ldots b_{43}\}$ is the L1-RSRP of a first CRI or SSB index, the bits $\{b_{21} \ldots b_{26}\}$ is the reported a second CRI or SSB index, and the bits $\{b_{27} \ldots b_{30}\}$ is the differential L1-RSRP of a second CRI or SSB index using the L1-RSRP of a first CRI or SSB index as the reference. the bits $\{b_{11} \ldots b_{16}\}$ is the reported a third CRI or SSB index, and the bits $\{b_{17} \ldots b_{20}\}$ is the differential L1-RSRP of a third CRI or SSB index using the L1-RSRP of a first CRI or SSB index as the reference. the bits $\{b_1 \ldots b_6\}$ is the reported a fourth CRI or SSB index, and the bits $\{b_7 \ldots b_{10}\}$ is the differential L1-RSRP of a fourth CRI or SSB index using the L1-RSRP of a first CRI or SSB index as the reference.

In yet another example, the bits $\{b_1 \ldots b_6\}$ is the reported a first CRI or SSB index, the bits $\{b_{25} \ldots b_{30}\}$ is the L1-RSRP of a first CRI or SSB index, the bits $\{b_7 \ldots b_{12}\}$ is the reported a second CRI or SSB index, and the bits $\{b_{31} \ldots b_{34}\}$ is the differential L1-RSRP of a second CRI or SSB index using the L1-RSRP of a first CRI or SSB index as the reference. the bits $\{b_{13} \ldots b_{18}\}$ is the reported a third CRI or SSB index, and the bits $\{b_{35} \ldots b_{38}\}$ is the differential L1-RSRP of a third CRI or SSB index using the L1-RSRP of a first CRI or SSB index as the reference. the bits $\{b_{19} \ldots b_{24}\}$ is the reported a fourth CRI or SSB index, and the bits $\{b_{39} \ldots b_{43}\}$ is the differential L1-RSRP of a fourth CRI or SSB index using the L1-RSRP of a first CRI or SSB index as the reference.

In yet another example, the bits $\{b_{38} \ldots b_{43}\}$ is the reported a first CRI or SSB index, the bits $\{b_{13} \ldots b_{19}\}$ is the L1-RSRP of a first CRI or SSB index, the bits $\{b_{32} \ldots b_{37}\}$ is the reported a second CRI or SSB index, and the bits $\{b_9 \ldots b_{12}\}$ is the differential L1-RSRP of a second CRI or SSB index using the L1-RSRP of a first CRI or SSB index as the reference. the bits $\{b_{26} \ldots b_{31}\}$ is the reported a third CRI or SSB index, and the bits $\{b_5 \ldots b_8\}$ is the differential L1-RSRP of a third CRI or SSB index using the L1-RSRP of a first CRI or SSB index as the reference. the bits $\{b_{20} \ldots b_{25}\}$ is the reported a fourth CRI or SSB index, and the bits $\{b_1 \ldots b_4\}$ is the differential L1-RSRP of a fourth CRI or SSB index using the L1-RSRP of a first CRI or SSB index as the reference.

In yet another example, the bits $\{b_{19} \ldots b_{24}\}$ is the reported a first CRI or SSB index, the bits $\{b_{37} \ldots b_{43}\}$ is the L1-RSRP of a first CRI or SSB index, the bits $\{b_{13} \ldots b_{18}\}$ is the reported a second CRI or SSB index, and the bits $\{b_{33} \ldots b_{36}\}$ is the differential L1-RSRP of a second CRI or SSB index using the L1-RSRP of a first CRI or SSB index as the reference. the bits $\{b_7 \ldots b_{12}\}$ is the reported a third CRI or SSB index, and the bits $\{b_{29} \ldots b_{32}\}$ is the differential L1-RSRP of a third CRI or SSB index using the L1-RSRP of a first CRI or SSB index as the reference; the bits $\{b_1 \ldots b_6\}$ is the reported a fourth CRI or SSB index, and the bits $\{b_{25} \ldots b_{28}\}$ is the differential L1-RSRP of a fourth CRI or SSB index using the L1-RSRP of a first CRI or SSB index as the reference.

In yet another example, the bits $\{b_{20} \ldots b_{25}\}$ is the reported a first CRI or SSB index, the bits $\{b_1 \ldots b_7\}$ is the L1-RSRP of a first CRI or SSB index, the bits $\{b_{26} \ldots b_{31}\}$ is the reported a second CRI or SSB index, and the bits $\{b_8 \ldots b_{11}\}$ is the differential L1-RSRP of a second CRI or SSB index using the L1-RSRP of a first CRI or SSB index as the reference. the bits $\{b_{32} \ldots b_{37}\}$ is the reported a third CRI or SSB index, and the bits $\{b_{12} \ldots b_{15}\}$ is the differential L1-RSRP of a third CRI or SSB index using the L1-RSRP of a first CRI or SSB index as the reference. the bits $\{b_{38} \ldots b_{43}\}$ is the reported a fourth CRI or SSB index, and the bits $\{b_{16} \ldots b_{19}\}$ is the differential L1-RSRP of a fourth CRI or SSB index using the L1-RSRP of a first CRI or SSB index as the reference.

The aforementioned embodiments can be applied to other values of N easily with very straightforward generalization. In the present disclosure, all the methods and embodiments described can be applied to the beam reporting on CSI-RS and can be applied to the beam reporting on NR-SS blocks.

In the present disclosure, the name "CSI-RS resource index" is exemplary and can be substituted with other names, like "NR-SS block index." "SS block index" or "SS-PBCH block index."

In some embodiments, the UE can be requested to report the information of N CSI-RS resource indices and their corresponding L1-RSRP values. In one example, the UE can be requested to report N CSI-RS resource indices or SS block indices or beam IDs, $\{C_{i1}, C_{i2}, \ldots, C_{iN}\}$. In such example, where the indices in can be sorted in ascending order based on RSRP/RSRQ/CQI. The RSRP (or RSRQ, or CQI) of CSI-RS resource $C_{L1}$ is less than or equal to the RSRP (or RSRQ, or CQI) of CSI-RS resource $C_{i2}$; The RSRP (or RSRQ, or CQI) of CSI-RS resource $C_{i2}$ is less than or equal to the RSRP (or RSRQ, or CQI) of CSI-RS resource $C_{i3}$; and so on. The RSRP (or RSRQ, or CQI) of CSI-RS resource $C_{iN}$ is the largest among the N reported CSI-RS resources in CRI=$\{C_{i1}, C_{i2}, \ldots, C_{iN}\}$ and RSRP (or RSRQ, or CQI) of CSI-RS resource $C_{i1}$ is the smallest among the N reported CSI-RS resources in CRI=$\{C_{i1}, C_{i2}, \ldots, C_{iN}\}$. In such example, where the indices in can be sorted in descending order based on RSRP/RSRQ/CQI. The RSRP (or RSRQ, or CQI) of CSI-RS resource $C_{i1}$ is larger than or equal to the RSRP (or RSRQ, or CQI) of CSI-RS resource $C_{i2}$; The RSRP (or RSRQ, or CQI) of CSI-RS resource $C_{i2}$ is larger than or equal to the RSRP (or RSRQ, or CQI) of CSI-RS resource $C_{i3}$; and so on. The RSRP (or RSRQ, or CQI) of CSI-RS resource $C_{iN}$ is the smallest among the N reported CSI-RS resources in CRI=$\{C_{i1}, C_{i2}, \ldots, C_{iN}\}$ and RSRP (or RSRQ, or CQI) of CSI-RS resource $C_{i1}$ is the largest among the N reported CSI-RS resources in CRI=$\{C_{i1}, C_{i2}, \ldots, C_{iN}\}$.

In one example, the UE can report the RSRP information of one or some or all of those N reported CSI-RS resource indices, SS block indices or beam IDs. In such example, the UE can report the RSRP (RSRQ, CQI) of the reported CSI-RS resource index (SS block index, beam ID) $C_{i1}$. In such example, the UE can report the differential RSRP (RSRQ, CQI) of other reported CSI-RS resource index by using the RSRP (RSRQ, CQI) of $C_{i1}$ as the reference. Different bitwidth can be used for the differential RSRP (RSRQ, CQI) of those reported CSI-RS resource indices (SS block indices, beam IDs). In such example, the UE can report N=4 CSI-RS resource indices (SS block indices) and $\{C_{i1}, C_{i2}, C_{i3}, C_{i4}\}$ is sorted in descending order in terms of RSRP (RSRQ, CQI). The UE can report the RSRP of $C_{i1}$: $P_1$ and the differential of other three reported beam IDs: $\Delta_2$, $\Delta_3$ and $\Delta_4$ with $P_1$ being the reference. The UE can be requested to use 7 bits for $P_1$, 3 bits for $\Delta_2$, 4 bits for $\Delta_3$ and 5 bits for $\Delta_4$. In such example, the UE can report N=4 CSI-RS resource indices (SS block indices) and $\{C_{i1}, C_{i2}, C_{i3}, C_{i4}\}$ is sorted in descending order in terms of RSRP (RSRQ, CQI). The UE can report the RSRP of $C_{i1}$: $P_1$. The UE can be requested to report $\Delta_2$ that is the differential RSRP of $C_{i2}$, with respect to the RSRP of $C_{i1}$. The UE can be requested to report $\Delta_3$ that is the differential RSRP of $C_{i3}$, with respect to the RSRP of $C_{i3}$. The UE can be requested to report $\Delta_4$ that is the differential RSRP of $C_{i4}$, with respect to the RSRP of $C_{i3}$. In such example, the UE can report N=4 CSI-RS resource indices (SS block indices) and $\{C_{i1}, C_{i4}\}$ is sorted in descending order in terms of RSRP (RSRQ, CQI). The UE can report the RSRP of $C_{i4}$: $P_4$. The UE can be requested to report $\Delta_3$ that is the differential RSRP of $C_{i3}$, with respect to the RSRP of $C_{i4}$. The UE can be requested to report $\Delta_2$ that is the differential RSRP of $C_{i2}$, with respect to the RSRP of $C_{i3}$. The UE can be requested to report $\Delta_1$ that is the differential RSRP of $C_{i1}$, with respect to the RSRP of $C_{i2}$. In such example, the UE can report N=4 CSI-RS resource indices (SS block indices, beam IDs) and $\{C_{i1}, C_{i2}, C_{i3}, C_{i4}\}$ is sorted in ascending order in terms of RSRP (RSRQ, CQI). The above methods of reporting RSRP and differential RSRP can be easily applied here with no or minor updates.

In some embodiments, a TRP can configure a UE with a beam constraint window on the NR-SS signals. A beam constraint window is a time duration in which there are one or more NR-SS burst sets. The NR-SS burst set can be transmitted periodically every $N_p$ slots or $T_p$ milliseconds. In each NR-SS burst set, the can be $N_{ss}$ NR-SS blocks. Within each particular configured beam constraint window, the UE can be requested to assume that the signal in the NR-SS blocks with the same NR-SS block index from all NR-SS burst sets transmitted with that beam constraint window are transmitted with the same TRP Tx beam. In contrast, the UE cannot assume the signal in the NR-SS blocks with the same NR-SS block index from two NR-SS burst sets transmitted within two different beam constraint windows. Here the signal in NR-SS block can be NR-PSS signal, NR-SSS signal, NR-PBCH signal and/or the DMRS for NR-PBCH. The signal can be used by the UE to measure and report the beam state information.

The aforementioned embodiment is useful when the signals in NR-SS are used for beam measurement and reporting for beam measurement. The NR-SS blocks are transmitted periodically. Each NR-SS burst set can have $N_{SS}$ NR-SS blocks and the NR-SSS signal in each NR-SS block can correspond to one Tx beam. Each NR-SS burst set can correspond $N_{SS}$ TRP Tx beams. When configured to measure the beam state information on NR-SS blocks, a UE may know which NR-SS burst sets correspond to the same set of TRP Tx beams and the UE can measure and average the NR-SS signal of one NR-SS block in those NR-SS burst sets.

Figure 10:
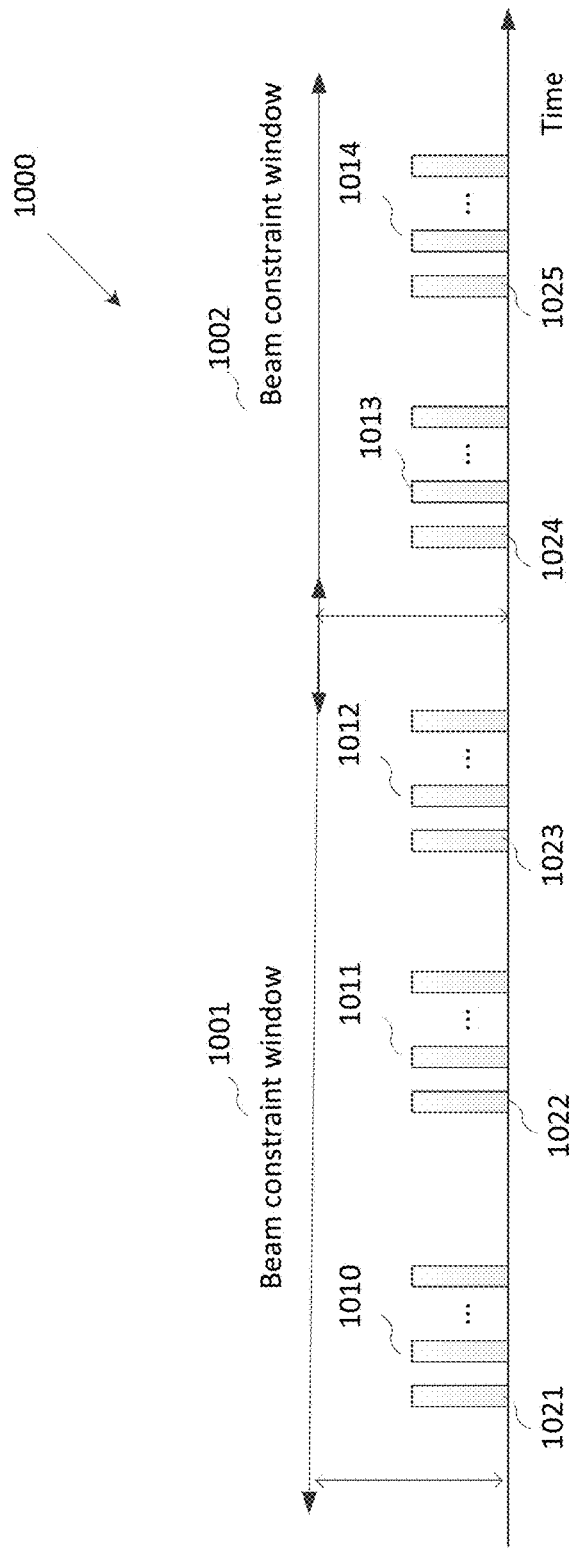
FIG. 10 illustrates an example beam constraint window configuration according to embodiments of the present disclosure.

FIG. 10 illustrates an example beam constraint window configuration 1000 according to embodiments of the present disclosure. An embodiment of the beam constraint window configuration 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

NR-SSS signal in NR-SS block is used as example for illustration purpose. NR-SSS can be interchanged with other signals in NR-SS block or the combination of signals in NR-SS block without changing the embodiments in the present disclosure.

As shown in FIG. 10, a UE is configured with beam constraint windows 1001 and 1002. Within beam constraint window 1001, there are SS block burst sets 1010, 1011, and 1012. Within beam constraint window 1002, there are SS block burst sets 1013 and 1014. The SS block burst sets can be transmitted periodically every $N_p$ slot and each SS block burst set can contain $N_{SS}$ NR-SS blocks. Within beam constraint window 1001, the UE can assume the NR-SSS signals in the NR-SS blocks with same index in SS burst sets 1010, 1011, and 1012 are transmitted with the same TRP Tx beam(s). Within beam constraint window 1002, the UE can assume the SS blocks with same index in SS burst sets 1013 and 1014 are transmitted with the same TRP Tx beam(s). However, the UE cannot assume the NR-SSS signals in NR-SS blocks with index i in SS burst sets 1010, 1011, and 1012 and SS blocks with index i in SS burst sets 1013 and 1014 are transmitted with the same TRP Tx beam(s).

As shown in FIG. 10, the SS block 1021 in NR-SS burst set 1010, NR-SS block 1022 in SS burst set 1011 and SS block 1023 in SS burst set 1012 have the same NR-SS block index and the UE can assume the same TRP Tx beam(s) are applied to NR-SSS signal transmitted in NR-SS blocks 1021, 1022, and 1023. As shown in FIG. 10, the NR-SS block 1024 in SS burst set 1013 and NR-SS block 1025 in NR-SS burst set 1014 have the same index and the UE can assume the same TRP Tx beam(s) are applied to the NR-SSS signals transmitted in NR-SS blocks 1024 and 1025. In contrast, the UE cannot assume the same TRP Tx beam(s) are applied to the NR-SSS signal in NR-SS block 1021 (or 1022, 1023) and NR-SSS signals in NR-SS block 1024 or 1025.

In one embodiment, the beam constraint window can be configured by an initial slot index $l_0$ and a beam constraint window length $L_{BC}$ slots. With these two configured parameters, the UE can be configured to assume that the beam constraint windows on NR-SS blocks are: one beam constraint window is slot $l_0$ to slot $l_0+L_{BC}-1$; one beam constraint window is slot $l_0+L_{BC}$ to slot $l_0+2\times L_{BC}-1$; one beam constraint window is slot $l_0+2\times L_{BC}$ to slot $l_0+3\times L_{BC}-1$; one beam constraint window is slot $l_0+n\times L_{BC}$ to slot $l_0+(n+1)\times L_{BC}-1$ for n=0, 1, 2, . . . . The parameters $l_0$ and $L_{BC}$ can be specific in the specification. The parameters $l_0$ and $L_{BC}$ can be signaled in system information (SIBs), high layer signaling (e.g., RRC).

In one embodiment, the UE can be configured that a beam constraint window starts from the RRC connection is built and ends at the RRC connection is re-established.

In one embodiment, a one-bit indicator can be signaled in system information, RRC signaling or MAC-CE to indicate the starting of one beam constraint window. In one example, a UE can receive one-bit indicator in slot $n_1$. The UE can be configured to assume a beam constraint window starts from slot $n_1+\Delta n$ and lasts until a new one-bit indicator is received in slot $n_2$.

In some embodiments, a UE can be configured to report the beam state information based on the measurement on signals in NR-SS blocks and the UE can be requested to measure the signals in NR-SS blocks with one particular beam constraint window.

Figure 11:
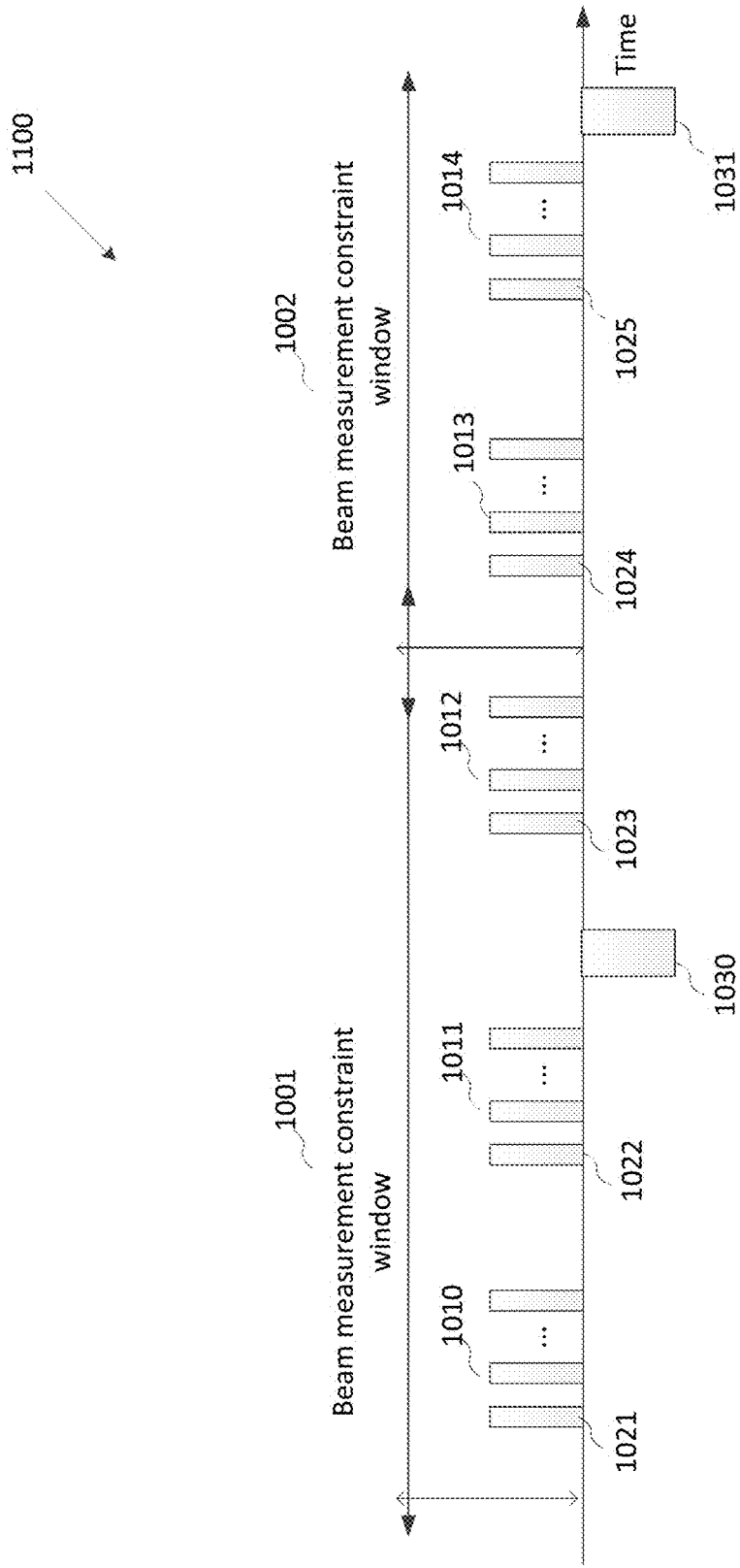
FIG. 11 illustrates an example beam measurement with beam constraint window configuration according to embodiments of the present disclosure.

FIG. 11 illustrates an example beam measurement 1100 with beam constraint window configuration according to embodiments of the present disclosure. An embodiment of the beam measurement 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

As shown in FIG. 11, in slot 1030, a UE is configured to report the beam state information based on the beam measurement on NR-SSS signals in NR-SS blocks. The beam reporting in slot 1030 is during the beam constraint window 1001. For the reporting in 1030, the UE can be request to only use the NR-SS blocks in NR-SS burst sets 1010 and 1011 to measure the beam measurement. The beam reporting in slot 1031 is during beam constraint window 1002. For the beam reporting in slot 1031, the UE can be requested to only use the NR-SS blocks in NR-SS burst sets 1013 and 1014.

In one embodiment, the UE can be requested to report one NR-SS block index that has the largest RSRP of NR-SSS signal among all the NR-SS blocks. As shown in FIG. 11, for the reporting in 1030, the UE can assume that the NR-SSS signal in NR-SS block with same index in NR-SS burst set 1010 and 1011 are transmitted with the same TRP Tx beam. The UE can use the NR-SS block index i in NR-SS burst set 1010 and 1011 to measure the RSRP of NR-SSS signal for NR-SS block index i. In one example, the UE can average or apply some filter on the RSRPs of NR-SSS signals in NR block index i in NR-SS burst set 1010 and 1011.

As shown in FIG. 11, for the reporting in 1031, the UE can assume that the NR-SSS signal in NR-SS block with same index in NR-SS burst set 1013 and 1014 are transmitted with the same TRP Tx beam. The UE can use the NR-SS block index j in NR-SS burst set 1013 and 1014 to measure the RSRP of NR-SSS signal for NR-SS block index j. In one example, the UE can average or apply some filter on the RSRPs of NR-SSS signals in NR block index j in NR-SS burst set 1013 and 1014.

In one embodiment, the UE can be requested to report the beam state information for NR-SS block only based on the measurement from the latest NR-SS burst set before the beam reporting.

In one embodiment, a UE can be configured with an association between an NR-SS block and a CSI-RS resource. When the UE is configured with that a CSI-RS resource k is associated with NR-SS block i, the UE can assume that the Tx beam applied to the transmission on CSI-RS on CSI-RS resource k is refined beam with respect to the Tx beam applied to the transmission of NR-SSS signal (or, NR-PSS signal, NR-PBCH signal or DMRS to the NR-PBCH) in NR-SS block i.

In one example, the TRP can configure a NR-SS block index i in the configuration of one CSI-RS resource and that CSI-RS resource can be configured to be associated with NR-SS block index i. In one example, the TRP can configure K CSI-RS resources in one RS setting in the CSI framework and the TRP can configure a NR-SS block index i for those K CSI-RS resources. Those K CSI-RS resources can be configured to be associated with NR-SS block index i. The NR-SS block index can be signaled in high level signaling (e.g., RRC) as part of the CSI-RS resource configuration.

In one embodiment, the TRP can configure a NR-SS bock index i in the activation message in MAC-CE for semi-persistent transmission of K CSI-RS resources. When receiving the activation message, the UE can assume that the Tx beam applied to semi-persistent CSI-RS transmission on K CSI-RS resources is refined beam with respect to the Tx beam applied to the transmission of NR-SSS signal (or, NR-PSS signal, NR-PBCH signal or DMRS to the NR-PBCH) in NR-SS block i.

In one embodiment, the TRP can configure a NR-SS bock index i in the trigger message (through MAC-CE or L1 signaling) for aperiodic transmission of K CSI-RS resources. When receiving the activation message, the UE can assume that the Tx beam applied to aperiodic CSI-RS transmission on K CSI-RS resources is refined beam with respect to the Tx beam applied to the transmission of NR-SSS signal (or, NR-PSS signal, NR-PBCH signal or DMRS to the NR-PBCH) in NR-SS block i.

In one embodiment, the TRP can signal one NR-SS block index i to a UE at slot n and the UE can be requested to assume that all the CSI-RS transmission after slot n+$\Delta$n (where $\Delta$n can be $\geq$0) are associated with NR-SS block index i. until the TRP signals a new NR-SS block index j.

Figure 12:
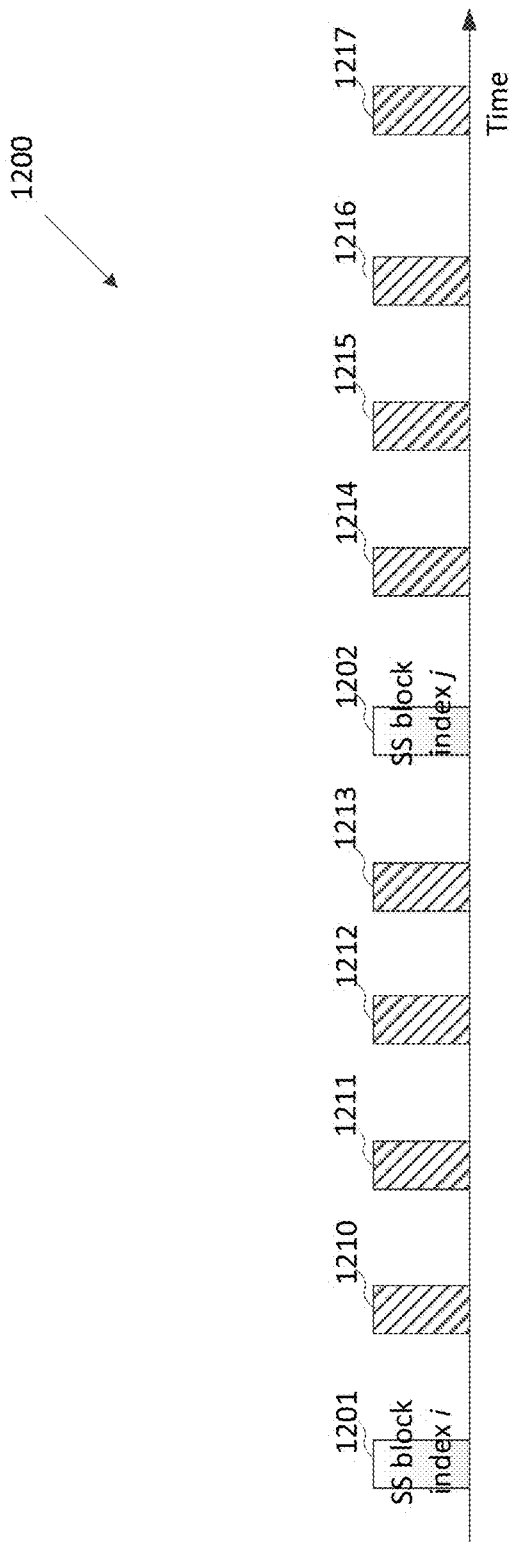
FIG. 12 illustrates an example NR-SS block and CSI-RS association according to embodiments of the present disclosure.

FIG. 12 illustrates an example NR-SS block and CSI-RS 1200 association according to embodiments of the present disclosure. An embodiment of the NR-SS block and CSI-RS 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

As shown in FIG. 12, in slot 1201, the TRP signals SS block index i to a UE. In slot 1202, the TRP signals SS block index j to the UE. The TRP transmits CSI-RS transmission in slots 1210, 1211, 1212, and 1213. The UE can be requested to assume that the CSI-RS transmission in slots 1210, 1211, 1212, and 1213 are associated with SS block index i. The TRP transmits CSI-RS transmission in slots 1214, 1215, 1216, and 1217. The UE can be requested to assume that the CSI-RS transmission in slots 1214, 1215, 1216, and 1217 are associated with SS block index j.

In one embodiment, the UE can be requested to report one NR-SS block index i to the TRP at slot n and the UE can be requested to assume that all the CSI-RS transmission after slot n+$\Delta$n (where $\Delta$n can be $\geq$0) are associated with NR-SS block index i. until the UE reports a new NR-SS block index j at slot $n_1$.

Figure 13:
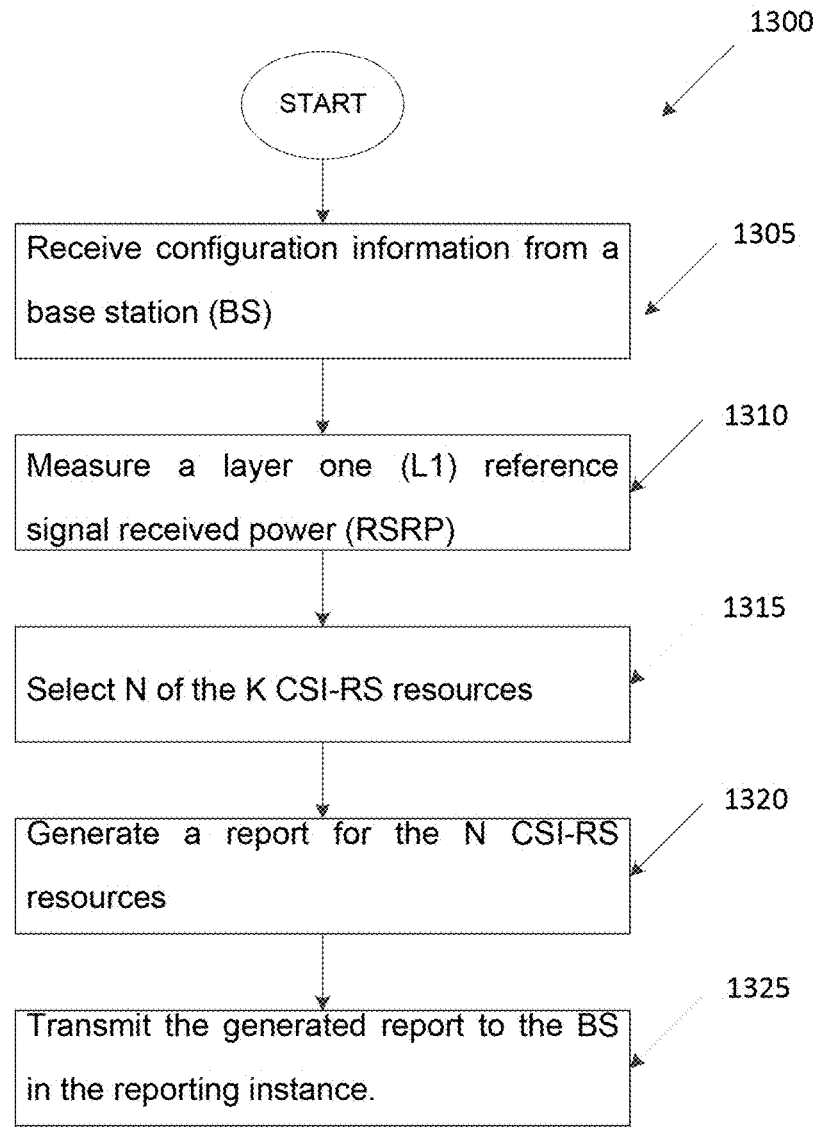
FIG. 13 illustrates another flow chart of a method for reporting channel information according to embodiments of the present disclosure.

FIG. 13 illustrates another flow chart of a method 1300 for reporting channel information according to embodiments of the present disclosure, as may be performed by a user equipment (UE). An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

As shown in FIG. 13, the method 1300 starts at step 1305. In step 1305, the UE receives configuration information from a base station (BS). In step 305, the configuration information indicates K channel state information (CSI) reference signal (RS) resources configured, by the BS, for measurement by the UE.

In step 1310, the UE measures a layer one (L1) reference signal received power (RSRP) for one or more of the K CSI-RS resources. In some embodiments, a number of bits in the report for the L1-RSRP value for the one N CSI-RS resource having the largest L1-RSRP is greater than a number of bits in the report for the differential L1-RSRP value for each of the other of the N CSI-RS resources. In some embodiments, a differential L1-RSRP for each of the other of the N CSI-RS resources is computed with reference to the largest L1-RSRP. In some embodiments, a step size for bits indicating the L1-RSRP value for the one N CSI-RS resource having the largest L1-RSRP in the report is different than a step size for bits indicating the differential L1-RSRP value for each of the other of the N CSI-RS resources. In some embodiments, the UE further measures a reference signal received quality (RSRQ) for each of the N CSI-RS resources. In such embodiments, the report further includes an indication of the RSRQ for each of the N CSI-RS resources.

In step 1315, the UE selects N of the K CSI-RS resources for reporting in a reporting instance. In some embodiments, the CRIs of the N CSI-RS resources in the report are sorted based on measured L1-RSRP for the N CSI-RS resources. In some embodiments, the configuration information further comprises an indication from the BS of one or more of the K CSI-RS resources to select for reporting in the N CSI-RS resources. In some embodiments, the UE in step 1315 selects the N CSI-RS resources comprises selecting one or more CSI-RS resources based on the indication from the BS.

In step 1320, the UE generates a report for the N CSI-RS resources, the generated report including a CSI-RS resource index (CRI) for each of the N CSI-RS resources, a L1-RSRP value for one of the N CSI-RS resources having a largest L1-RSRP, and a differential L1-RSRP value for each of the other of the N CSI-RS resources. In step 1320, generating the report comprises generating the report with a structure including a CRI of the one N CSI-RS resource having the largest L1-RSRP, followed by the L1-RSRP value of the one N CSI-RS resource having the largest L1-RSRP, followed by a CRI of a second of the N CSI-RS resources, followed by a differential L1-RSRP value for the second N CSI-RS resource.

In step 1325, the UE transmits the generated report to the BS in the reporting instance.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for reporting channel information, the UE comprising:
a transceiver configured to receive configuration information from a base station (BS), the configuration information indicating K, a number of channel state information (C SI) reference signal (RS) resources configured by the BS for measurement by the UE;
a processor operably connected to the transceiver, the processor configured to:
measure a reference signal received power (RSRP) for one or more of the K CSI-RS resources;
select a number N from the K CSI-RS resources for reporting in a reporting instance; and
generate, by the UE, a report for the N CSI-RS resources, the generated report including CSI-RS resource indices (CRIs) and RSRP values, wherein the CRIs comprise a CRI for each of the N CSI-RS resources for reporting in the reporting instance, wherein the RSRP values comprise a RSRP value for one of the N CSI-RS resources, and a differential RSRP value for each of the remaining N-1 CSI-RS resources, wherein the transceiver is further configured to transmit the generated report to the BS in the reporting instance,
wherein the report includes the CRIs and the RSRP values, in order of a CRI corresponding to the RSRP value, one or more other CRIs, the RSRP value, and one or more differential RSRP values.

2. The UE of claim 1, wherein the differential RSRP value is computed with a reference to the RSRP value.

3. The UE of claim 1, wherein the RSRP value comprises a largest RSRP value among RSRP values of the N CSI-RS resources.

4. The UE of claim 1, wherein the RSRP value and the differential RSRP value have different bit widths.

5. The UE of claim 1, wherein the RSRP value comprises a 7-bit value.

6. The UE of claim 1, wherein the RSRP value and the differential RSRP value have different resolutions.

7. The UE of claim 1, wherein the configuration information further indicates that measurement on the N CSI-RS resources is requested.

8. The UE of claim 1, wherein the configuration information includes at least one of:
information indicating that a report of the RSRPs is requested,
information indicating that the report is periodic, aperiodic, or semi-persistent, or
information indicating a periodicity of the report.

9. A base station (BS) for configuring channel information reporting, the BS comprising:
a processor configured to generate configuration information indicating K, a number of channel state information (C SI) reference signal (RS) resources configured for measurement by a user equipment (UE); and
a transceiver operably connected to the processor, the transceiver configured to:
transmit the configuration information to the UE; and
receive a report for a number N from the K CSI-RS resources in a reporting instance, the report including CSI-RS resource indices (CRIs) and reference signal received power (RSRP) values, wherein the CRIs comprise a CRI for each of the N CSI-RS resources for reporting in the reporting instance, wherein the RSRP values comprise a reference signal received RSRP value for one of the N CSI-RS resources, and a differential RSRP value for each of the remaining N CSI-RS resources,
wherein the report includes the CRIs and the RSRP values, in order of a CRI corresponding to the RSRP value, one or more other CRIs, the RSRP value, and one or more differential RSRP values.

10. The BS of claim 9, wherein the differential RSRP value is computed with a reference to the RSRP value.

11. The BS of claim 9, wherein the RSRP value comprises a largest RSRP value among RSRP values of the N CSI-RS resources.

12. The BS of claim 9, wherein the RSRP value and the differential RSRP value have different bit widths.

13. The BS of claim 9, wherein the RSRP value comprises a 7-bit value.

14. The BS of claim 9, wherein the RSRP value and the differential RSRP value have different resolutions.

15. The BS of claim 9, wherein the configuration information further indicates that measurement on the N CSI-RS resources is requested.

16. The BS of claim 9, wherein the configuration information includes at least one of:

information indicating that a report of the RSRPs is requested, information indicating that the report is periodic, aperiodic, or semi-persistent, or information indicating a periodicity of the report.

17. A method for reporting channel information by a user equipment (UE), the method comprising:

receiving, by the UE, configuration information from a base station (BS), the configuration information indicating K, a number of channel state information (CSI) reference signal (RS) resources configured by the BS for measurement by the UE;

measuring, by the UE, a reference signal received power (RSRP) for one or more of the K CSI-RS resources;

selecting, by the UE, N of the K CSI-RS resources for reporting in a reporting instance;

generating, by the UE, a report for the N CSI-RS resources for reporting in the reporting instance, the generated report including CSI-RS resource indices (CRIs) and RSRP values, wherein the CRIs comprise a CRI for each of the N CSI-RS resources, wherein the RSRP values comprise an RSRP value for one of the N CSI-RS resources, and a differential RSRP value for each of the remaining N CSI-RS resources; and transmitting, by the UE, the generated report to the BS in the reporting instance, wherein the report includes the CRIs and the RSRP values, in order of a CRI corresponding to the RSRP value, one or more other CRIs, the RSRP value, and one or more differential RSRP values.

18. The method of claim 17, wherein the differential RSRP value is computed with a reference to the RSRP value.

19. The method of claim 17, wherein the RSRP value comprises a largest RSRP value among RSRP values of the N CSI-RS resources.

20. The method of claim 17, wherein the RSRP value and the differential RSRP value have different bit widths.

21. The method of claim 17, wherein the RSRP value comprises a 7-bit value.

22. The method of claim 17, wherein the RSRP value and the differential RSRP value have different resolutions.

23. The method of claim 17, wherein the configuration information further indicates that measurement on the N CSI-RS resources is requested.

24. The method of claim 17, wherein the configuration information includes at least one of:

information indicating that a report of the RSRPs is requested, information indicating that the report is periodic, aperiodic, or semi-persistent, or information indicating a periodicity of the report.

* * * * *